United States Patent [19]
Lokken

[11] Patent Number: 6,167,396
[45] Date of Patent: Dec. 26, 2000

[54] METHOD AND APPARATUS FOR NAVIGATING AND DISPLAYING DATA POINTS STORED IN A MULTIDIMENSIONAL DATABASE

[75] Inventor: Robert C. Lokken, Boise, Id.

[73] Assignee: Knosys, Inc., Boise, Id.

[21] Appl. No.: 09/311,207

[22] Filed: May 12, 1999

[51] Int. Cl.[7] .................................................. G06F 17/30
[52] U.S. Cl. ............................................................. 707/3
[58] Field of Search ...................................... 707/3, 2, 1

[56] References Cited

U.S. PATENT DOCUMENTS 5,359,724  10/1994  Earle ........................................ 707/205
5,781,906   7/1998  Aggarwal et al. ...................... 707/102
5,978,796  11/1999  Mallory et al. ............................. 707/3

OTHER PUBLICATIONS

Hurtado, C. A. et al. "Maintaining Data Cubes under Dimension Updated", Procedings 15th Intern. Conf. on Data Engineering, Mar. 1999, pp. 346–355.

Williams, M.G. et al. Experimentally Driven Visual Language Design: Texture Perception Experiments for Iconographic Displays.

*Primary Examiner*—Jack Choules
*Attorney, Agent, or Firm*—Malcolm B. Wittenberg

[57] ABSTRACT

A method and apparatus for forming a decomposition tree in navigating through the data points in a multidimensional database.

30 Claims, 22 Drawing Sheets

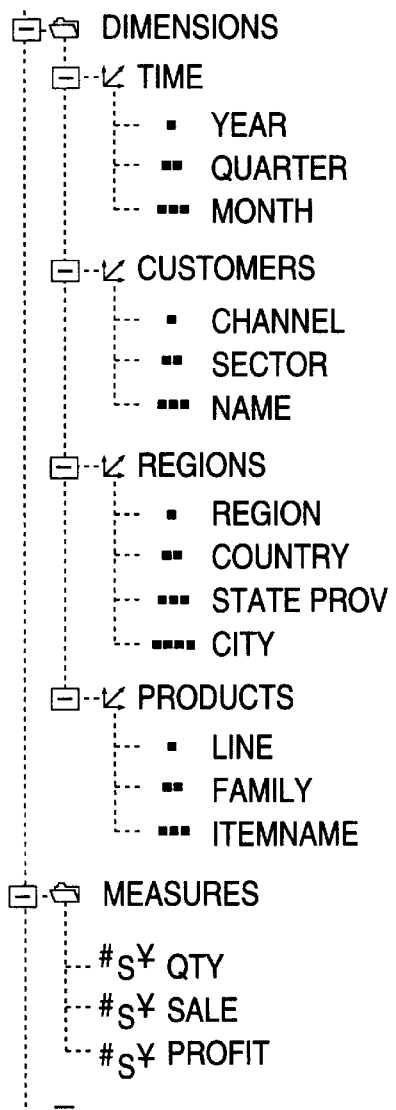
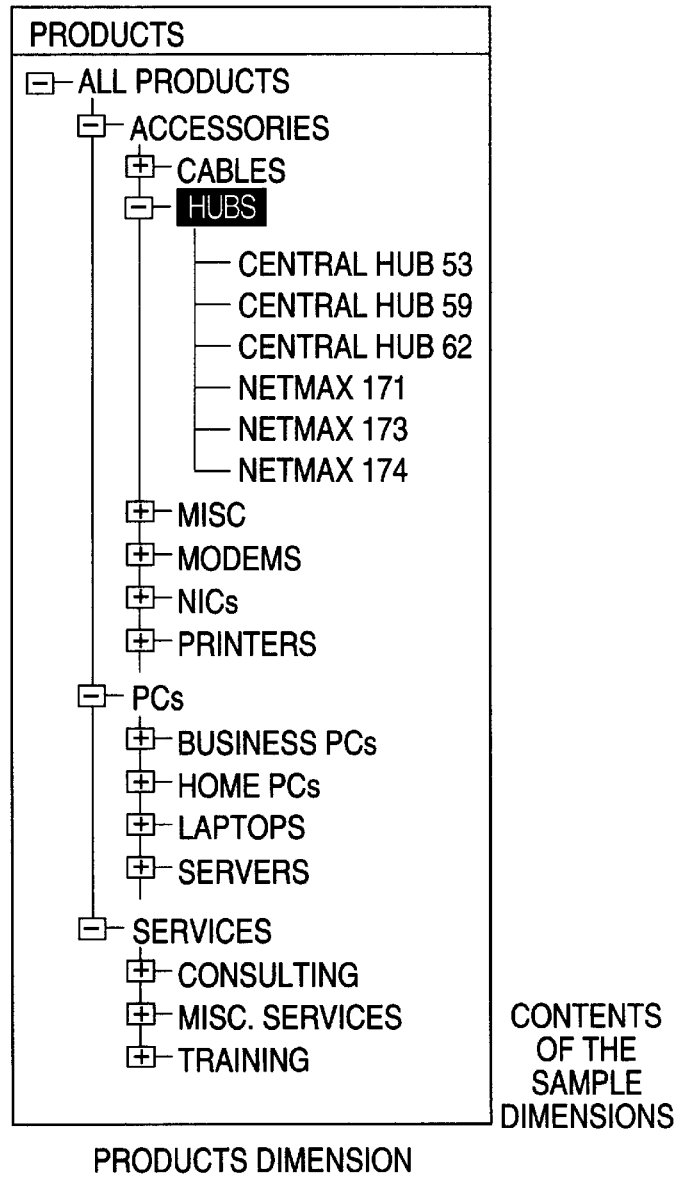
CONTENTS OF THE SAMPLE DIMENSIONS
PRODUCTS DIMENSION
FIG. 3  FIG. 4A

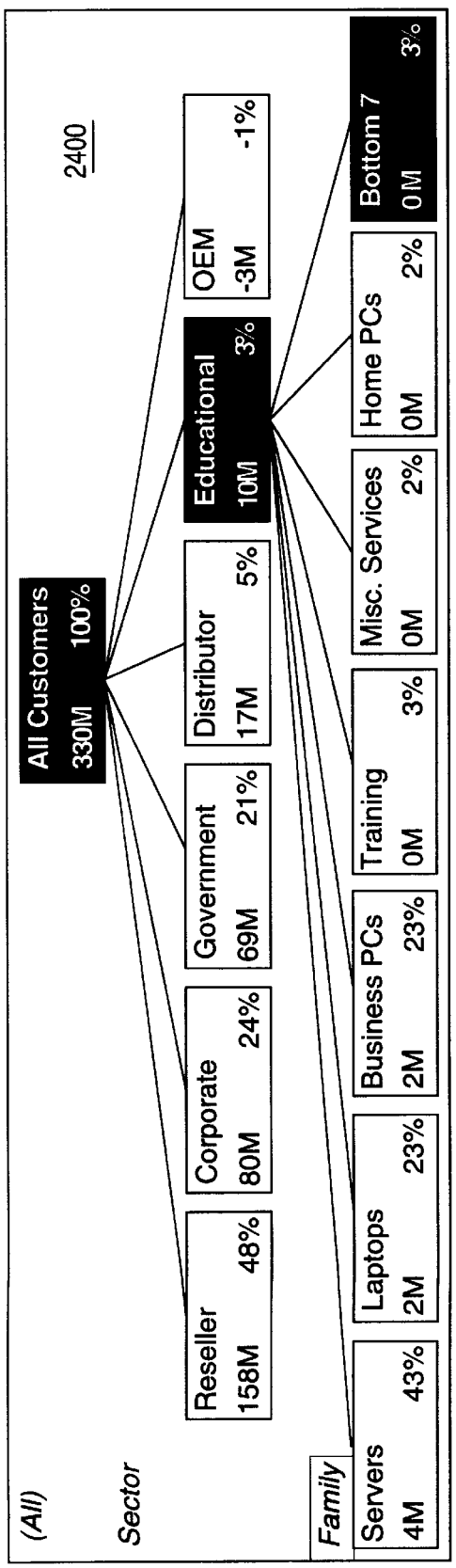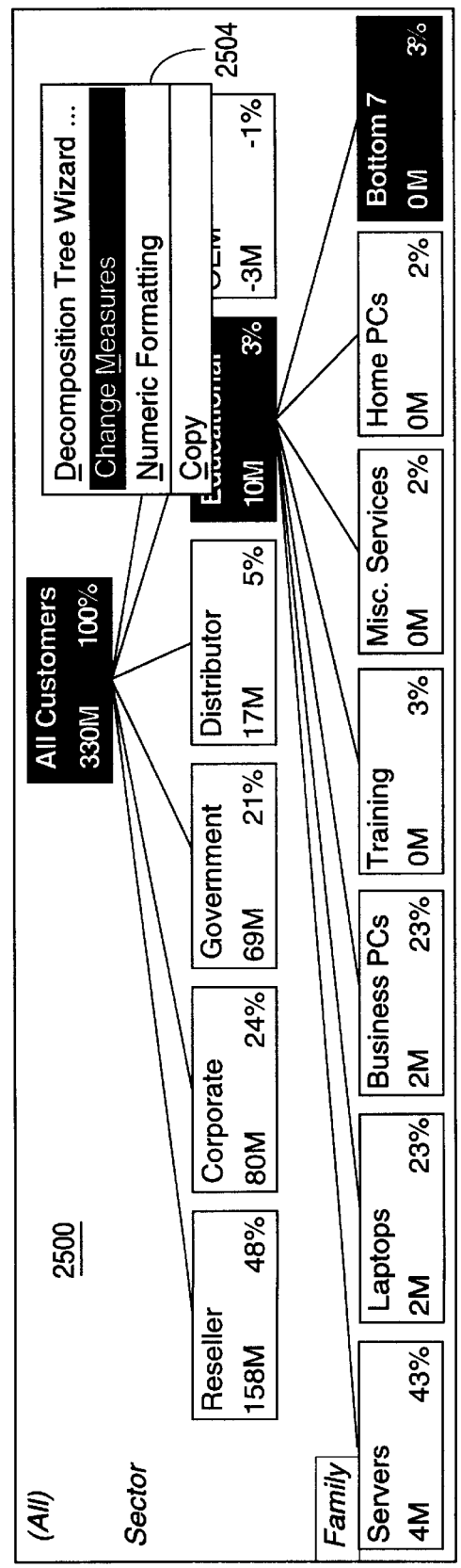
FIG. 24
FIG. 25

METHOD AND APPARATUS FOR NAVIGATING AND DISPLAYING DATA POINTS STORED IN A MULTIDIMENSIONAL DATABASE

FIELD OF THE INVENTION

The present invention relates generally to a method and apparatus for visually displaying data, and more specifically, to a method and apparatus for navigating and displaying data points stored in a multidimensional database.

BACKGROUND OF THE INVENTION

The data in a multidimensional information system can be defined (or arranged) along multiple dimensions. For example, the data in a sales management system may include time, location, customer, and product dimensions. A dimension may include many members. The members in one dimension can be organized as a hierarchical tree with multiple levels.

FIG. 1 shows an exemplary dimension tree for the data along a product dimension; in which "All Products" is a member; "Furniture" is a member; "Electronics" is a member; "Beds" is a member; and so on. In the dimensional tree, the upward connections are called parent connections, and the downward connections are called child connections. "All Products" is the first level member in the dimension tree; "Furniture" and "Electronics" are the second level members in the dimension tree; "Desks", "Chairs", "Beds", "Home Appliance", and "Office Equipment" are the third level members in the dimension tree; and so on. "Furniture" is the parent of "Desks", "Chairs", and "Beds"; "Furniture" and "Electronics" are children of "All Products"; and so on. A member without a parent is called root member. Specifically, "All Products" is a root member.

In a multidimensional database system having N dimensions with multiple levels per dimension, a data point (or cell) is defined as the intersection of one member from each dimension. The N dimensions form a cube, which contains all data points in the database system. Thus, the more dimensions and levels per dimension, the more complex is the neighboring data points surrounding a given data point. For example, in an N-dimensional database with each dimension having only one level, each data point in the database has 2N immediate neighboring data points or navigation directions. The multidimensional information system are described in greater detail in *OLAP Solutions* by Erik Thomsen published in 1997. This book is incorporated into this application by reference.

Thus, efforts have been made to develop tools for facilitating users to navigate through multidimensional database and display data points that are being navigated along multiple dimensions. However, the existing data navigation and display tools does not provide the flexibility in navigating data points along multiple dimensions. Specifically, in the existing data navigation and display tools, the navigation paths are limited by the hierarchical structure of the multidimensional database. Thus, a user may not be able to navigate through a multidimensional database in a sequence of paths that fits the user's thought process. In addition, the existing data navigation and display tool displays the data points separately on a computer screen. Thus, it does not present a comprehensive view for the data points that are being navigated.

Furthermore, the existing data navigation and display tool processes multidimensional data points within a single dimensional hierarchy. To change a dimension in the middle of a data navigation process, a user has to perform a so called "pivotal" process to bring a new dimension into focus. In doing so, the user may lose the navigation paths previously performed, thus losing the context and importance of the piece of data that is being currently displayed on the computer screen. Also, such a "pivotal" process is relatively complicated and not easy for an average user to grasp.

There is, therefore, a need for an improved method and apparatus that provide flexible navigation paths through the data points in a multidimensional database.

There is another need for an improved method and apparatus that provide users with a comprehensive graphical view of the data points stored in a multidimensional database, while the data points are being navigated.

There is yet another need to provide an improved method and apparatus for navigating and displaying the data points stored in a multidimensional database, which are easier for users to use.

The present invention provides such a method and apparatus to meet these three needs.

SUMMARY OF THE INVENTION

To overcome the shortcomings in the existing art, the present invention provides a novel method for displaying data points stored in a multidimensional database.

In a broad aspect, the invention provides a method for displaying data points stored in a multidimensional database. The data points are defined along at least two dimensions. The method comprises the steps of: extracting a parent data point from the multidimensional database; displaying the parent data point as a parent data point icon in a data point tree; selecting the parent data point icon from the data point tree; extracting, from the multidimensional database, a plurality of child data points under the parent data point along one of the at least two dimensions; and displaying the child data points as respective icons in the data point tree, together with the relationships between the parent data point and the child data points.

The present invention also provides a corresponding apparatus to perform the steps described in the above method

BRIEF DESCRIPTION OF THE DRAWINGS

The purpose and advantages of the present invention will be apparent to those skilled in the art from the following detailed description in conjunction with the appended drawing, in which:

FIG. 3 shows a hierarchy structure of an exemplary multidimensional database, which will be used to demonstrate the process of displaying a decomposition tree, in accordance with the present invention FIG. 4A shows a hierarchy structure of the Product dimension shown in FIG. 3;

FIG. 24 shows a screen shot illustrating the decomposition tree resulting from the user's selection in FIG. 23;

FIG. 25 shows a screen shot illustrating a step of changing measure for decomposition tree;

DETAILED DESCRIPTION OF THE PREFERRED EMBODIMENT

The following description is presented to enable any person skilled in the art to make and use the invention, and is provided in the context of a particular application and its requirements. Various modifications to the preferred embodiments will be readily apparent to those skilled in the art, and the principles defined herein may be applied to other embodiments and applications without departing from the spirit and scope of the invention. Thus, the present invention is not intended to be limited to the embodiments shown, but is to be accorded with the broadest scope consistent with the principles and features disclosed herein.

Figure 1:
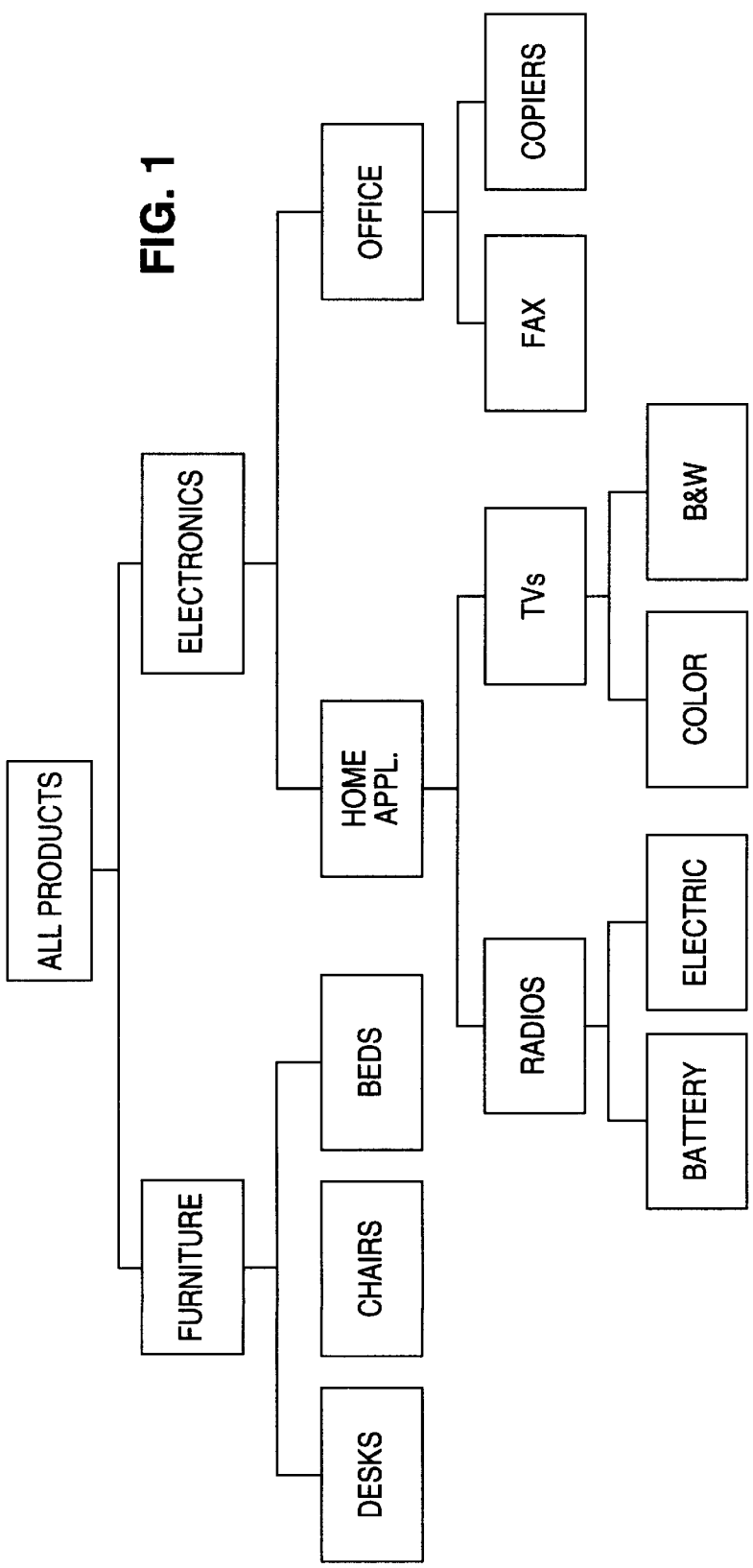
FIG. 1 shows an exemplary dimension tree for the data along a product dimension.
Figure 2:
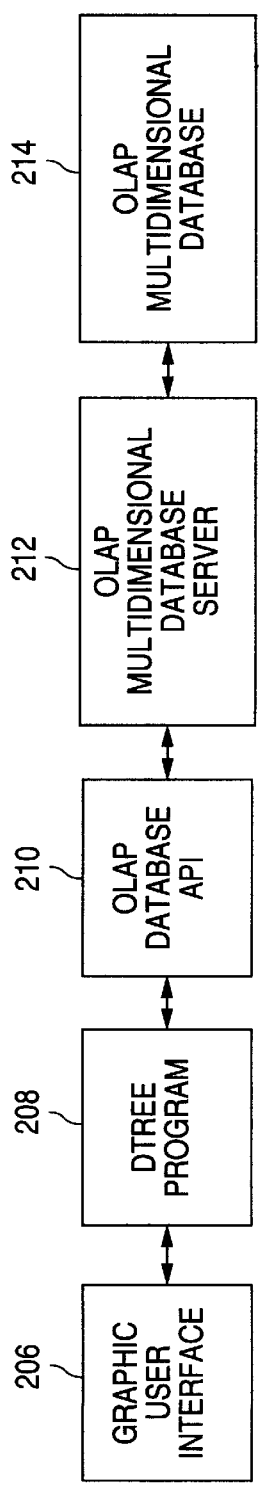
FIG. 2 is a block diagram showing a system for displaying a decomposition tree, in accordance with the present invention

FIG. 2 is a block diagram showing a system 200 for displaying a decomposition tree containing the data points that are stored in a multidimensional database, in accordance with the present invention.

As shown in FIG. 2, the system 200 includes a graphic user interface 206 that is displayed on a computer monitor screen, a decomposition tree (Dtree) program 208, an OLAP (On Line Analysis Processing) database API (Application Interface) 210, an OLAP multidimensional database server (OLAP server) 212, and a multidimensional database (OLAP database) 214.

The OLAP database 214 stores data in multidimensional format, and the structural information (called meta-data) about the data. The OLAP server 212 manages the multidimensional data stored in the OLAP database 214. Specifically, the OLAP server 212 allows users to define the structure of the multidimensional data, load data into the OLAP database 214, and execute data queries over data in the OLAP database 214. The OLAP database API 210 receives data queries from the Dtree program 208, sends them to the OLAP server 212, and receives resulting information from the OLAP server 212. A commercial available OLAP database API is the OLE-DB for OLAP, published by Microsoft Corporation and implemented in several OLAP products. Information queried from the OLAP server 212 takes two forms: (1) meta-data, and (2) user data. Meta-data, which describes the structure and contents of the OLAP database 214, consists of available data files, cubes, dimensions, levels, measures, etc.

Interacting with the graphic user interface 206 by using a mouse and a keyboard (not shown), a user can communicate with the Dtree program 208, sending control requests and data queries to the Dtree program 208. In response to the control requests (such as selections or changes on dimensions, measures, and levels) from the user, the Dtree program 208 sets the decomposing parameters for displaying a decomposition tree. In response to the data queries, the Dtree program 208 retrieves the meta-data from the OLAP database API 210 and presents the meta-data as menu options to the user as to the structure of the data points in the OLAP database 214. When the user indicates, via the graphic user interface 206, to the Dtree program 208 which data point is of interest and which structure element (i.e. dimension and level) he/she wants to break down, the Dtree program 208 issues a data query to the OLAP database API 210. Upon receiving the data values of the data points of interest, the Dtree program 208 displays the data points and data values in a tree format to the user, according to the structure defined by the meta-data.

FIG. 3 shows a hierarchy structure of an exemplary multidimensional database, which will be used to demonstrate the process of displaying a decomposition tree below, in accordance with the present invention.

As shown in FIG. 3, the database structure 300 includes four dimensions: Time, Customers, Regions, and Products. The "Time" dimension is divided into three levels: Year, Quarter, and Month. The "Customers" dimension is divided into three levels: Channel, Sector, and Name. The "Regions" dimension is divided four levels: Region, Country, State Province, and City. The "Products" dimension is divided into three levels: Line, Family, and Itemname. The four dimensions form a cube, which contains all data points in the multidimensional database. The database structure 300 further includes Measures having three individual measures: Quantity, Sale, and Profit. Measures are quantitative values in the space cube. Each of the data points in the OLAP database 214 has its respective values relating to these three measures.

FIG. 4A shows a hierarchy structure of the "Products" dimension shown in FIG. 3. In FIG. 4A, the "Products" dimension has a root member "All-Products", which connects to three child members: Accessories, PCs, and Services. The "Accessories" member connects to six child members: Cables, Hubs, Miscellaneous, Modems, NICs, and Printers. The "Hub" member further connects to six child members: CentralHub 53, CentralHub 59, CentralHub 62, NetMax 171, NetMax 173, and NetMax 174. The "PCs" member connects to four child members: Business PCs, Home PCs, Laptops, and Servers. The "Services" member connects to three child members: Consulting, Miscellaneous Services, and Training.

Figure 4B:
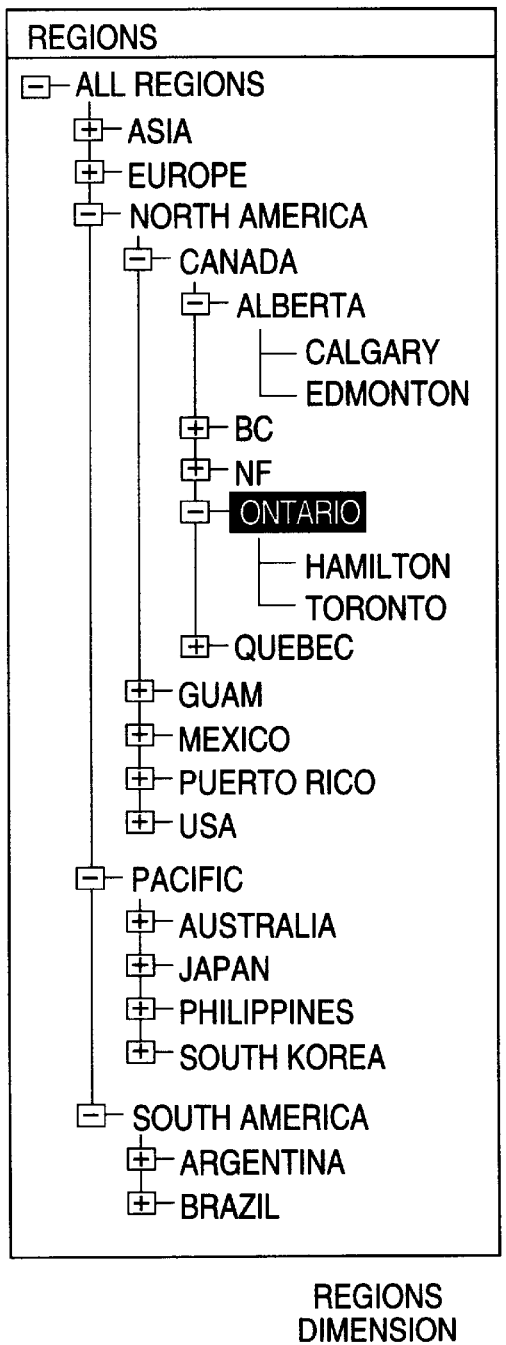
FIG. 4B shows a hierarchy structure of the Regions dimension shown in FIG. 3
Figure 4C:
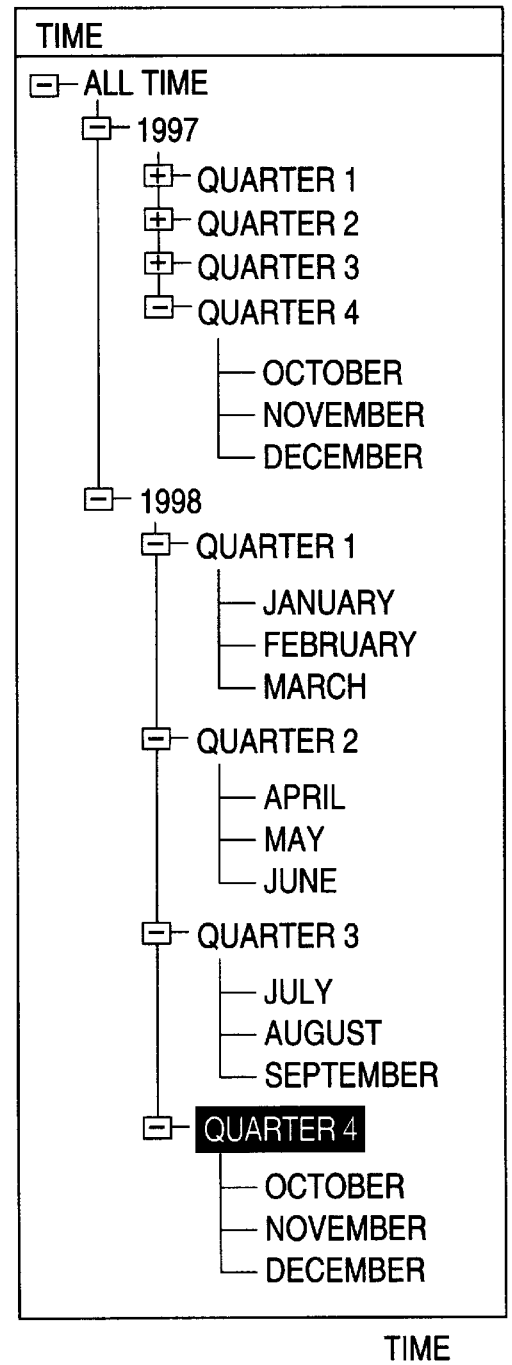
FIG. 4C shows a hierarchy structure of the Time dimension shown in FIG. 3
Figure 4D:
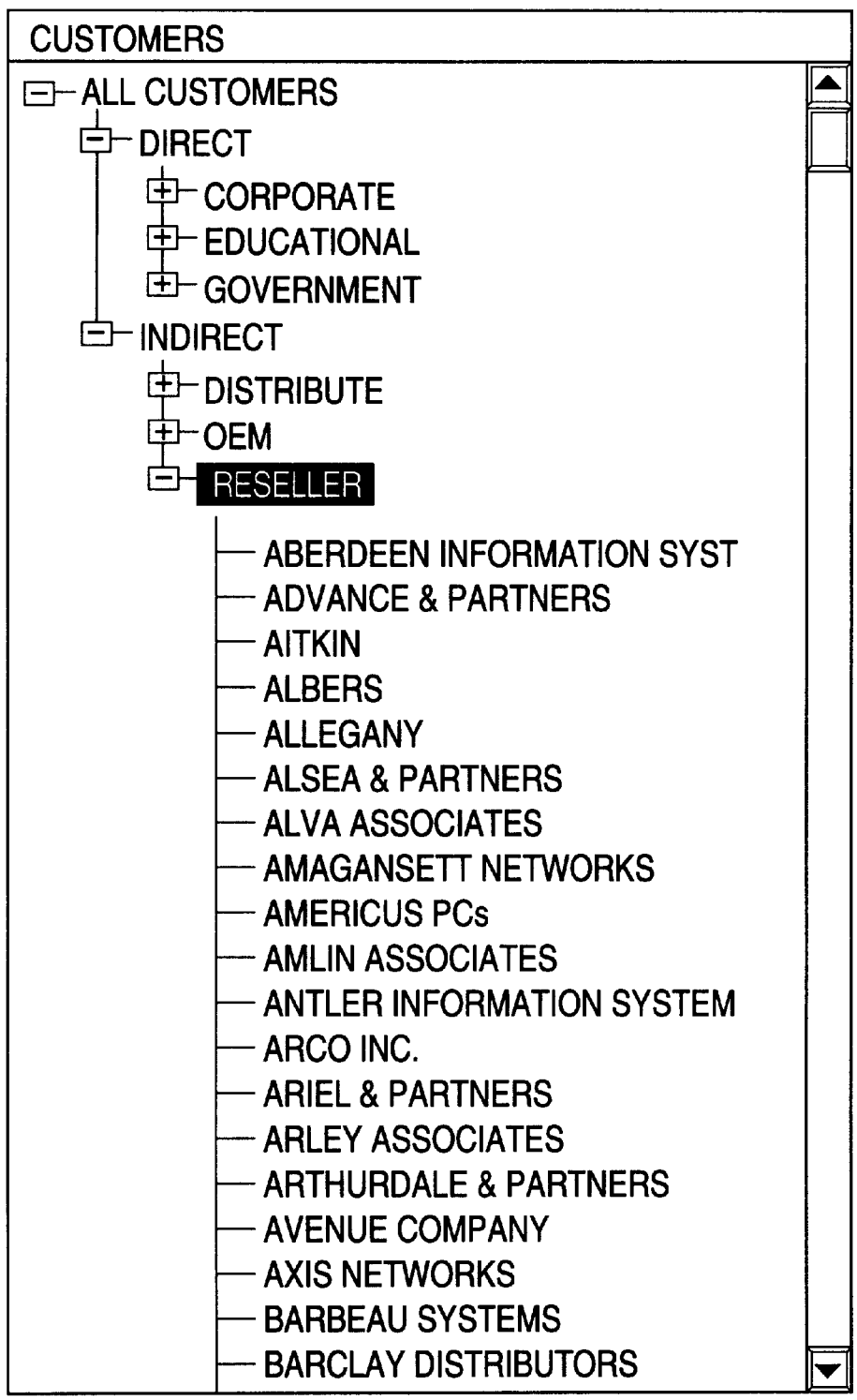
FIG. 4D shows a hierarchy structure of the Customer dimension shown in FIG. 3.

FIG. 4B shows a hierarchy structure of the "Regions" dimension of FIG. 3. FIG. 4C shows a hierarchy structure of the "Time" dimension of FIG. 3. FIG. 4D shows a hierarchy structure of the "Customers" dimension of FIG. 3. The hierarchy structures in FIGS. 4B–D can be broken down using a similar process described in connection with FIG. 4A.

FIGS. 5–25 show a sequence of screen shots illustrating a process of navigating through a plurality of data points and displaying them in the decomposition tree on a computer monitor screen, in accordance with the present invention.

In describing the process, it is assumed that the data points to be displayed have been stored in the OLAP database 214 with a structure as defined in FIGS. 3 and 4A–D. A user is navigating through the data points by using a mouse having a right button and a left button (not shown). These data points will be represented as data point icons on the monitor screen. The user can select a data point by left-clicking on the data point icon that represents the data point. By the same token, the user can select an item contained in a menu or pull-down list by left-clicking on the item. Each of the data points associates with a menu containing the information (meta-data) about the structure of the data point. The user can invoke (select) a menus that is associated with a data point by right-clicking on a corresponding data point icon. The decomposition tree also associates with a menu. The user can invoke the menu that is associated with the decomposition tree by right-clicking a vacant area on the screen shots shown in FIGS. 5–25.

Figure 5:
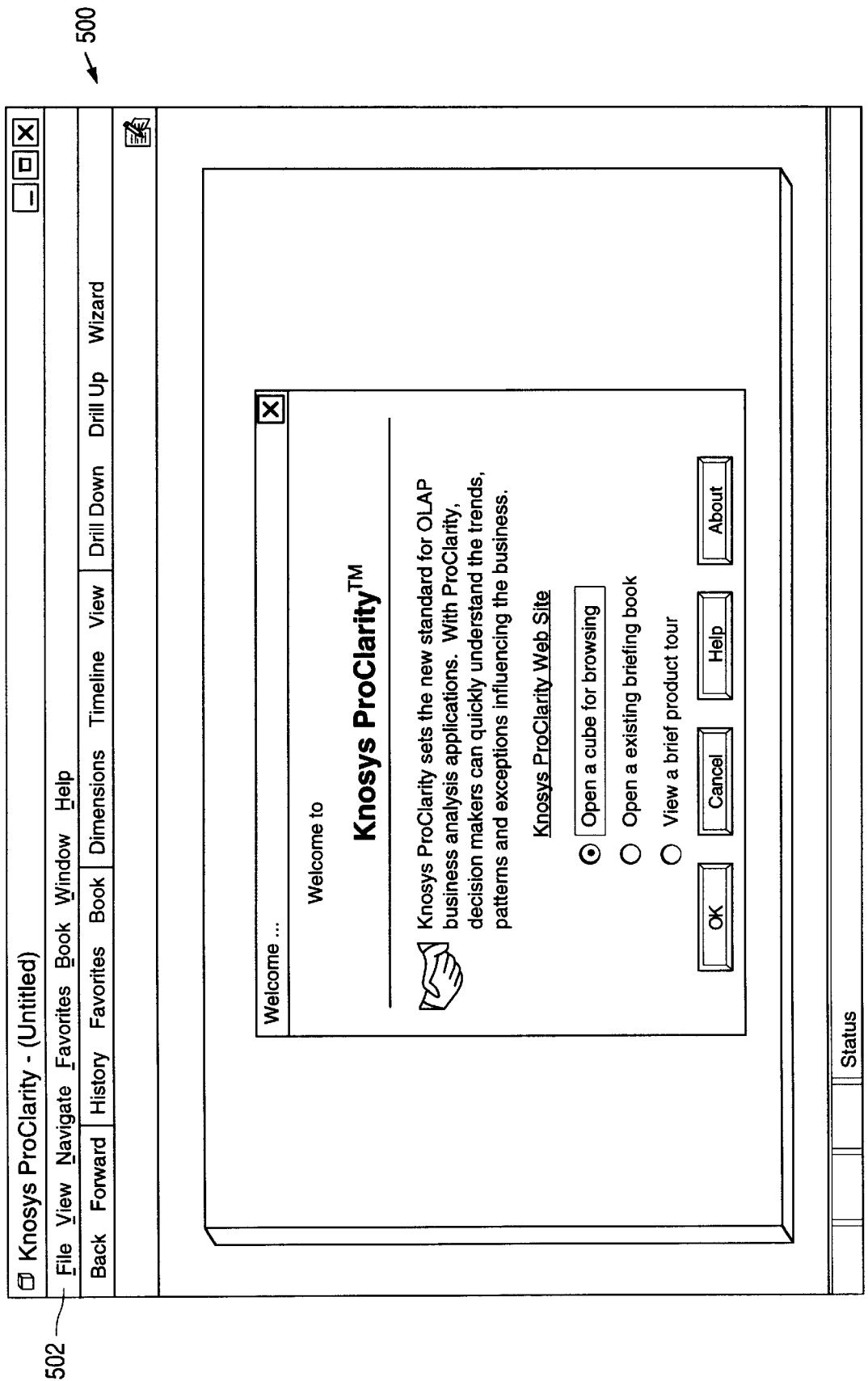
FIG. 5 shows a screen shot illustrating a user graphic interface for invoking the Dtree program of the present invention.

FIG. 5 shows a screen shot illustrating a graphic user interface 500 for invoking the Dtree program 208 produced by Knosys, Inc. To start the Dtree program 208, the user left-clicks on (selects) the "View" button 502. In response to the user's selection, the Dtree program 208 displays the screen shot 600, as shown in FIG. 6.

Figure 6:
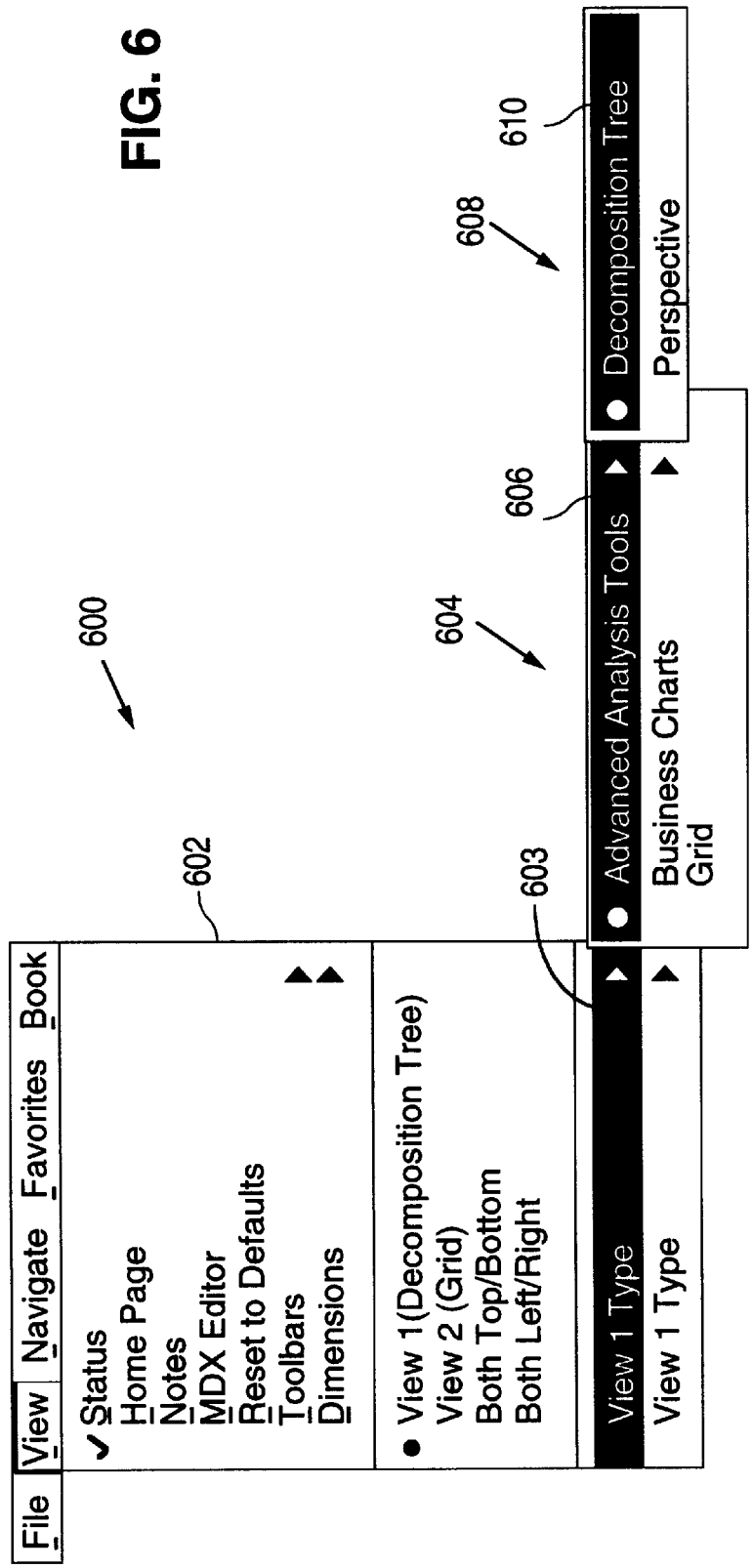
FIG. 6 shows a screen shot illustrating a step of creating a session and linking the session to a multidimensional database.
Figure 7:
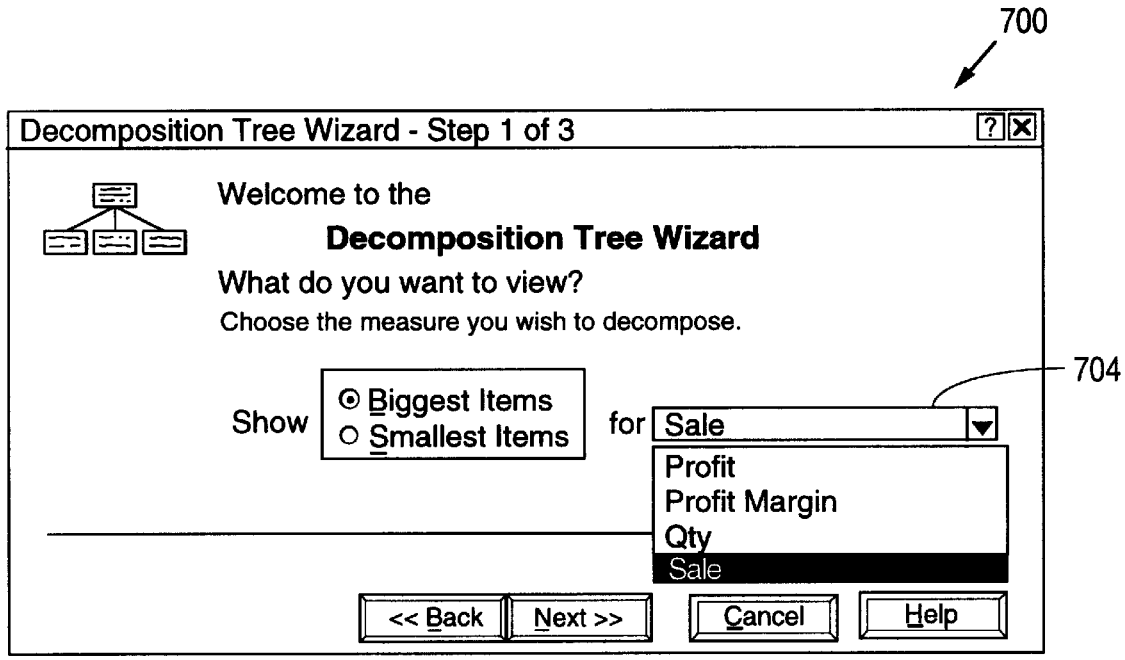
FIG. 7 shows a screen shot illustrating a screen shot of selecting a measure for viewing.

FIG. 6 shows a screen shot illustrating a step of creating a session for displaying a decomposition tree, and of linking the session to the OLAP database 214. As shown in FIG. 6, a pull-down list 602 is displayed on the screen shot 600. In response to user's left-click on (selection of) the "View 1 Type" item 603 in the pull down list 602, a second level pull-down list 604 is displayed on the screen shot 600. In response to user's left-click on (selection on the "Advanced Analysis Tools" item 606 in the pull-down list 604, a third level pull-down list 608 is displayed on the screen shot 600. In response to user's left-click on (selection on the "Decomposition Tree" item 610 in the pull-down list 608, the Dtree program 208 displays the screen shot 700 as shown in FIG. 7 on the screen. The user's left-click on (selection of) the "Decomposition Tree" item 610 causes the Dtree program 208 to create a session for the process and link the session to the OLAP database 214.

Figure 8:
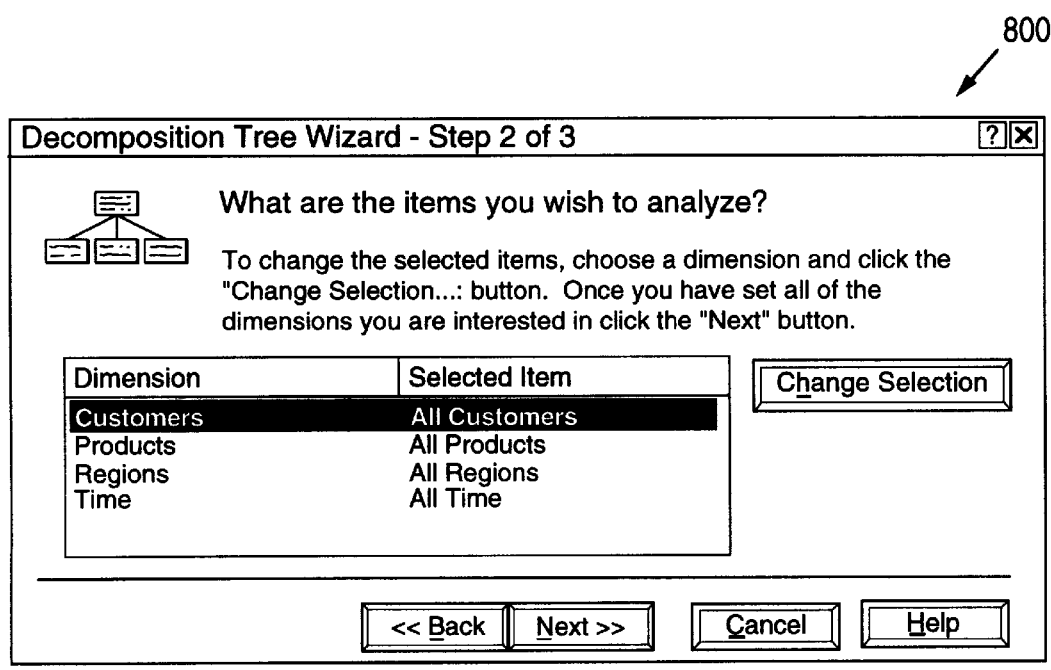
FIG. 8 shows a screen shot illustrating a step of selecting a root (starting) data point for the decomposition tree.
Figure 9:
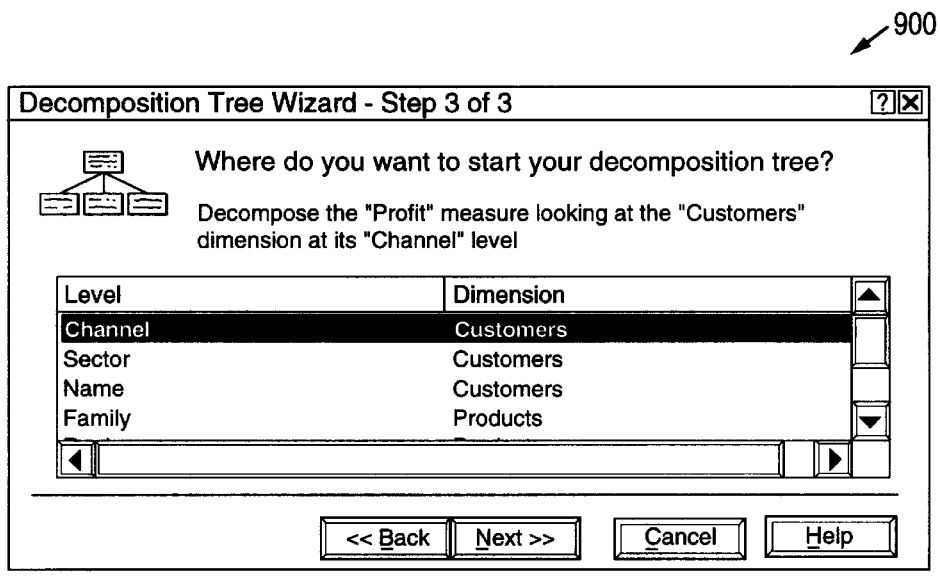
FIG. 9 shows a screen shot illustrating a step of selecting a dimension and level for viewing.

FIGS. 7–9 show three screen shots allowing the user to set decomposing parameters (measure, sorting order, dimension, level, etc) for the decomposition tree to be formed.

FIG. 7 shows the screen shot 700 illustrating a step of selecting a measure for viewing. As shown in FIG. 7, the user left-clicks on (selects) "Sales" from the pull-down list 704 as a measure so that a respective sales value in the OLAP database 214 will be displayed together with each of the data points in the decomposition tree. Further, the user left-clicks on (selects) the "Biggest Items" as sorting order so that the data points in the decomposing process will be sorted in a descending order. If the user had selected the "Smallest Item" as sorting order, the data points in the decomposition tree would be sorted in an ascending order. In response to the user's selection of the "Next" button 610 in the screen short 600, the Dtree program 208 displays the screen shot 800 as shown in FIG. 8.

FIG. 8 shows the screen shot 800 illustrating a step of selecting a root (starting) data point for the decomposition tree. As shown in FIG. 8, the "All Customers" data point is selected, as indicated by highlighted display. In response to the user's selection of the "Next" button, the Dtree program 208 displays the screen shot 900 as shown in FIG. 9.

FIG. 9 shows the screen shot 900 illustrating a step of selecting a dimension and level to begin the decomposing process. As shown in FIG. 9, the user left-clicks on (selects) the "Customer" dimension and the "Channel" level, as indicated by the highlighted display. The Dtree program 208 maintains and automatically updates (if necessary) the decomposing parameters (including measure, sorting order, dimension, level, and root data point) selected by the user, and uses them in the decomposing process. However, as will be described below, the user can change decomposing parameters in the middle of the decomposing process. In response to user left-click on (selection on the "Finish" button, the Dtree program 208 displays the screen shot 1000, as shown in FIG. 1000.

Figure 10:
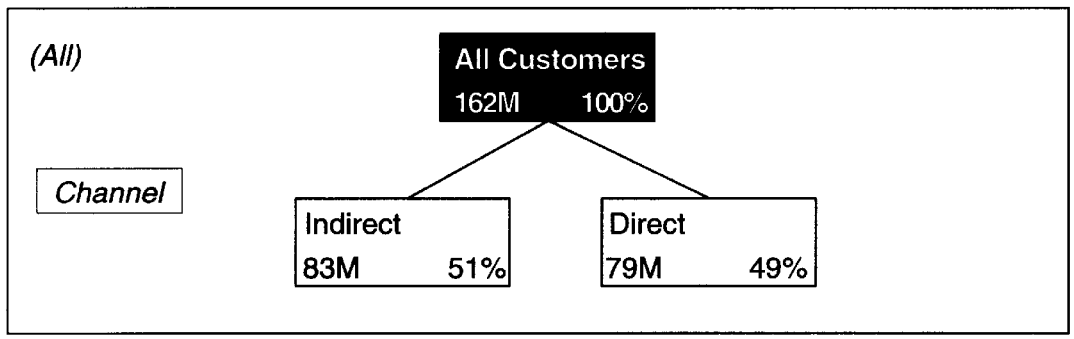
FIG. 10 shows a screen shot illustrate the decomposition tree along the "Customers" dimension at the "Channel" level

FIG. 10 shows the screen shot 1000 illustrating the decomposition tree including three data point icons that represent three data points. At the root level is the "All Customers" data point, which is broken down along the "Customers" dimension at the "Channel" level. As shown in FIG. 10, the "All Customers" data point connects to two child data points: an "Indirect Channel" data point and a "Direct Channel" data point. The "Indirect Channel" and "Direct Channel" data points have sales of 83M (million) and 79M, respectively; and contribute 51% and 49% of the sales measure respectively to the "All Customers" data point. These two data points are displayed according to a descending order according to the sales measure, specified in the screen shot 700. The relationships between the "All Customers" data point and the two "Channel" data points are represented by the connecting lines between them.

Figure 11:
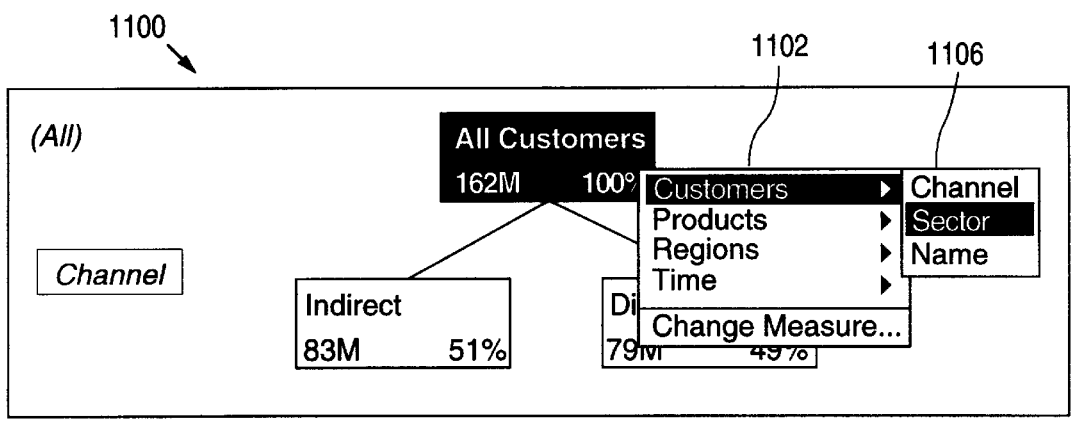
FIG. 11 shows a screen shot illustrate a step of skipping the "Channel" level along the "Customers" dimension.

FIG. 11 shows the screen shot 1100 illustrating a step of skipping the "Channel" level in the "Customers" dimension.

As shown in FIG. 11, the user right-clicks on (selects) the "All Customers" data point icon to display a dimension menu associated with the "All Customers" data point. In response, the Dtree program 208 displays a pull-down list 1102 on the screen. The pulldown list 1102 contains four dimension options (Customers, Products, Regions, and Time). To display a level menu associated with the "Customers" dimension, the user further left-clicks on (selects) the "Customers" dimension in the pull-down list 1102. In response, the Dtree program 208 displays a pull-down list 1106, which contains three level options (Channel—the first level, Sector—the second level, and Name—the third level) along the "Customers" dimension. To skip the "Channel" level, the user left-clicks (selects) "Sector" level in the pull-down list 1106. The user's selection of "Sector" level causes the Dtree program 208 to break the "All Customers" data point down to "Customers Sectors" along the "Customers" dimension. In response to the user's selection of the "Sector" level, the Dtree program displays the screen short 1200 shown in FIG. 12.

Figure 12:
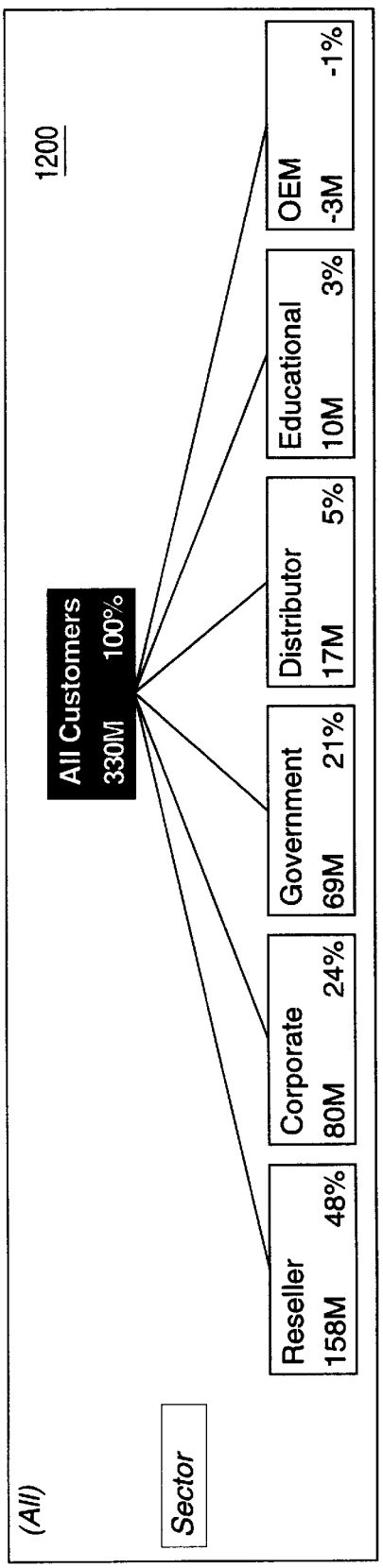
FIG. 12 shows a screen shot illustrating that the root data point ("All Customers" data point) is broken down to the "Customer Sectors"

FIG. 12 shows the screen shot 1200 illustrating that the "All Customers" data point is broken down to the "Customer Sectors", skipping the "Channel" level along the "Customers dimension". As shown in FIG. 12, the "All Customers" data point is broken down to eight "Customer Sector" data points, which are represented by eight data point icons: Reseller, Corporate, Government, Distributor, Education, and OEM. These eight "Customer Sector" data points have sales of 158M, 80M, 69M, 17M, 10M, −3M, respectively; and they are displayed in a descending order according to the sales measure. These eight data points make up the contributes of 48%, 24%, 21%, 5%, 3%, and −1% of the sales to the "All Customers" data point.

Figure 13:
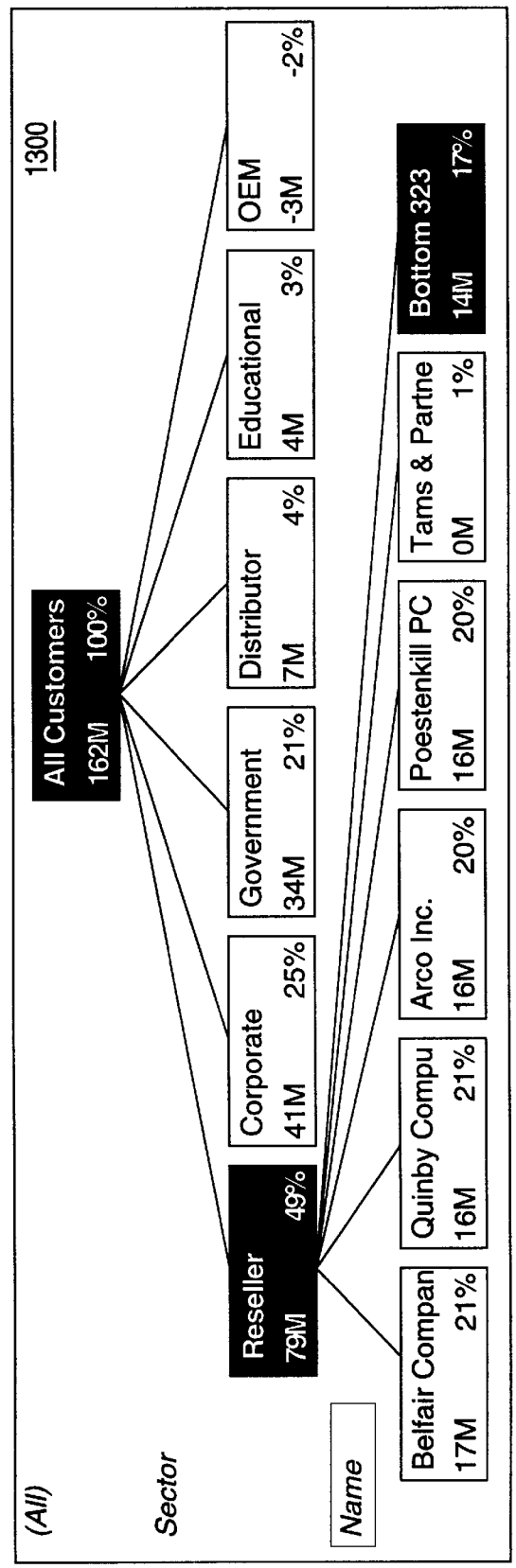
FIG. 13 shows a screen shot illustrate a step of displaying the child data points under the "Reseller" data point.

FIG. 13 shows a screen shot 1300 illustrating a step of displaying the child data points under the "Reseller" data point. To display the child data points under the "Reseller" data point, the user left-clicks on (selects) the "Reseller" data point icon. In response, the Dtree program 208 retrieves 328 data points under the "Reseller" data point from the LAP database 214, and displays six child data point icons to represent the 328 data points. It can be noticed that the Dtree program 208 groups 323 child data points having the lowest sales values into the "Bottom" data icon, so that all the child data points under the "Reseller" data point can be displayed in the monitor screen. Had the "Smallest Items" been selected in the screen shot 700, the Dtree program 208 would group 323 child data points having the highest sales values into a "Top" data icon. As shown in the screen shot 1300, the aggregation of the Sales values in the six child data point icons equals to the total sales value in the "Reseller" data point. Again, the six data point icons are displayed in a descending order according to Sales value.

Figure 14:
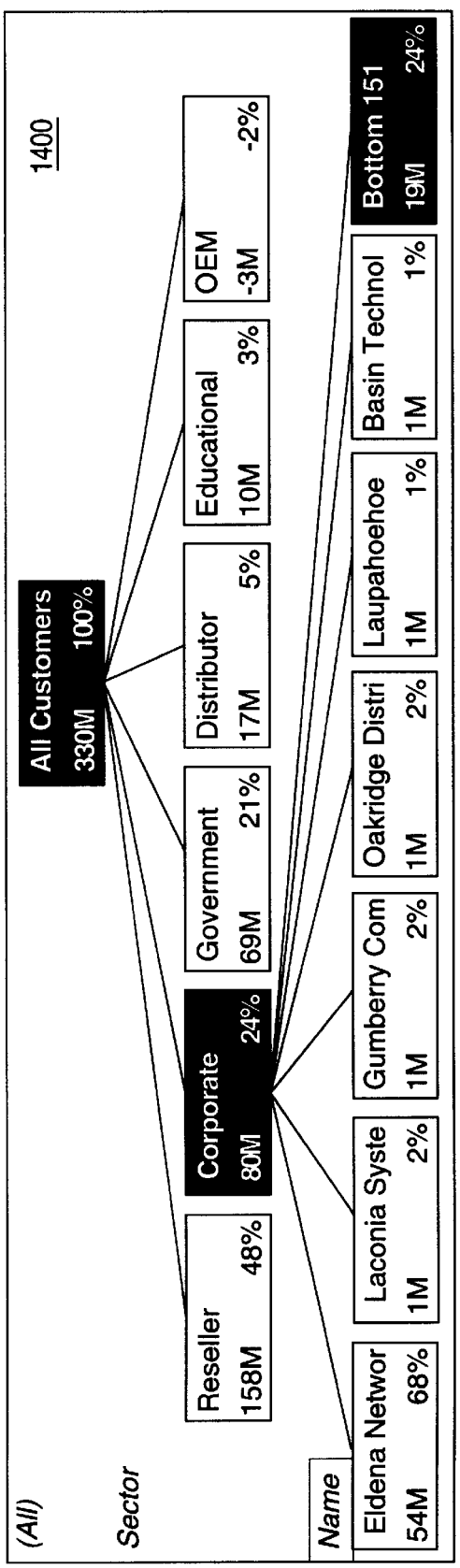
FIG. 14 shows a screen shot illustrating a step of displaying the child data points under the "Corporate" data point.

FIGS. 14 shows a screen shot 1400 illustrating a step of displaying the child data points under the "Corporate" data point. To display the child data points under the "Corporate" data point, the user left-clicks on (selects) the "Corporate" data point icon. In response, the Dtree program 208 retrieves 157 child data points under the "Corporate" data point, and displays seven child data point icons to represent the 157 child data points. In the meantime, the Dtree program 208 erases the six data point icons under the "Reseller" data point. It can be noticed that the Dtree program 208 groups 151 child data points having the lowest sales values into the "Bottom" data icon, so that all the child data points under the "Corporate" data point can be displayed on the monitor screen. Had the "Smallest Items" been selected in the screen shot 700, the Dtree program 208 would group 151 child data points having the highest sales values into a "Top" data icon.

Figure 15:
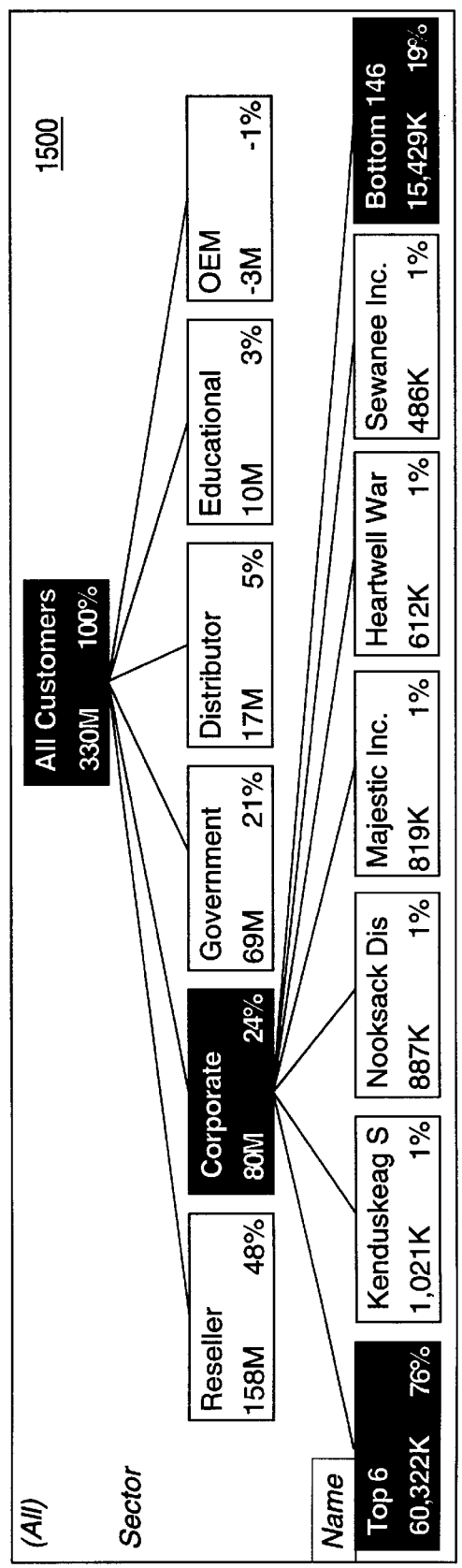
FIG. 15 shows a screen shot illustrating a step of shifting (or splitting) the data points grouped in the "Bottom" data point icon onto the screen

FIGS. 15 shows a screen shot 1500 illustrating a step of shifting (or splitting) the data points grouped in the "Bottom" data point icon onto the monitor screen. To display a child data point having the highest sales value in the "Bottom" data point icon, the user left-clicks on (selects) the "Bottom" data point icon once. In response, the Dtree program 208 shifts the child data point having the highest sales out of the "Bottom" data icon, and displays a data point icon to represent the data point that has been shifted out of the grouped data icon. In the means time, the Dtree program 208 groups the data point icon having the second highest sales value into the data point icon having the highest sales value. Specifically, to display five data points having the highest sales in the "Bottom" data point icon, the user left-clicks on (selects) the "Bottom" data icon in FIG. 1400 five times. In response, the Dtree program 208 displays five data point icons to represent the five data points having the highest sales in the "Bottom" data point icon. These five shifted data points are: Kenduskeag System, Nooksack Distribution, Majestic Inc., Heartwell War, and Sweanee Inc. In the meantime, the Dtree program 208 groups the five data point icons in the screen shot 1400 into a "Top" data point. These five grouped data points are: Laconia Syste, Gumberry Company, Oakridge Distribution, Laupahoehoe, and Basin Technology.

Figure 16:
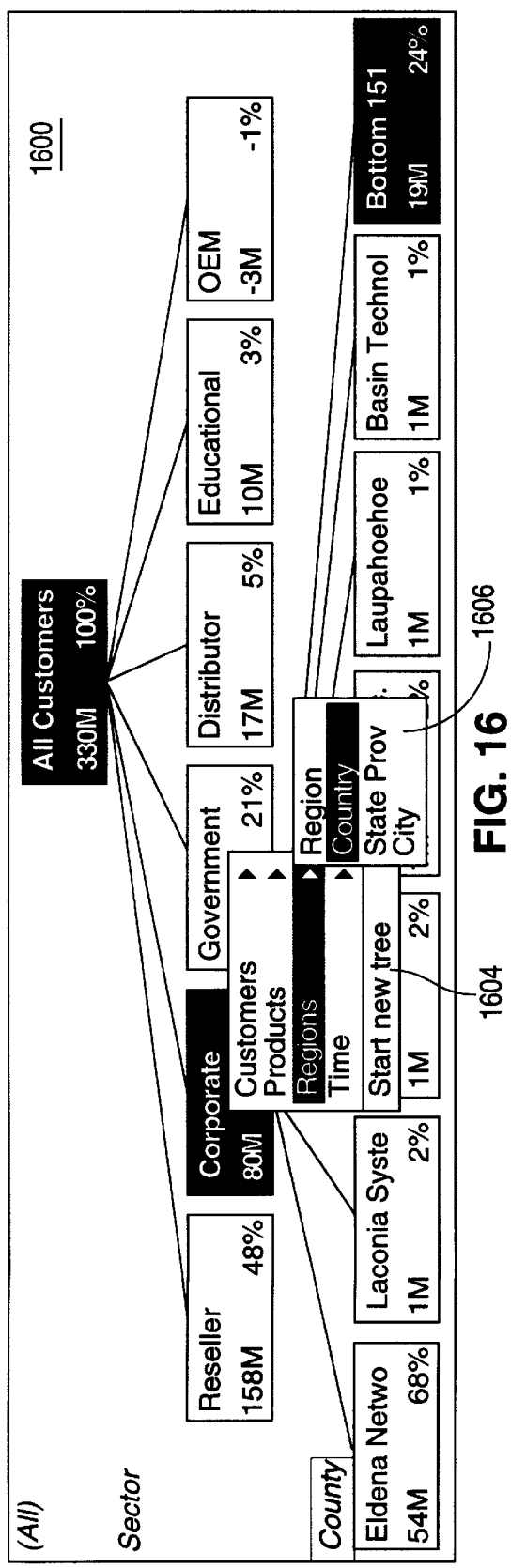
FIG. 16 shows a screen shot illustrating a step of changing dimension at a data point from which the decomposition tree is further broken down.

FIGS. 16 shows a screen shot 1600 illustrating a step of changing dimension at a data point from which the decomposition tree is further broken down. To change the dimension at the "Corporate" data point, the user rightclicks on (selects) the "Corporate" data point icon. In response, the Dtree program 208 displays a dimension menu associated with the "Corporate" data point at the "Sector" level in a pull-down list 1604. In response to user's rightclick on (selection of) "Regions" dimension in the pull-down list 1604, the Dtree program 208 further displays a level menu in a pull-down list 1606. In response to user's left-click on (selection on "Country" level in the pull-down list 1606, the Dtree program 208 changes the dimension from "Customers" to "Regions", and displays the screen shot 1700 as shown in FIG. 17.

Figure 17:
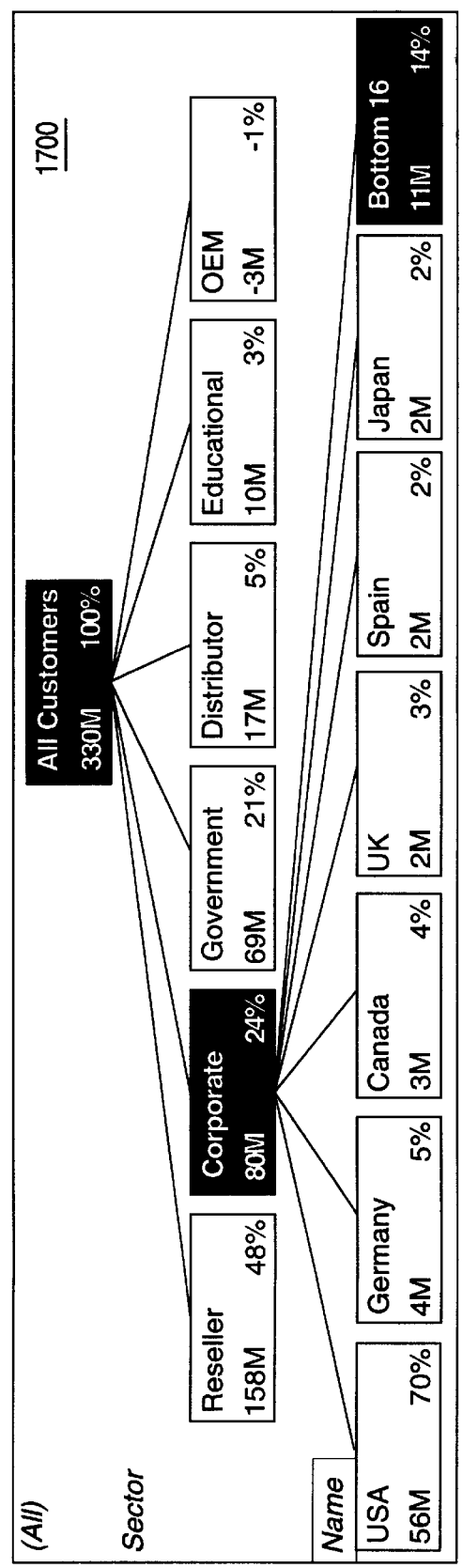
FIG. 17 shows a screen shot illustrating that the "Corporate" data point is broken down along the "Regions" dimension at the "Country" level.

FIG. 17 show the screen shot 1700 illustrating that the "Corporate" data point is broken down along the "Regions" dimension at "Country" level. It should be noted that in the decomposition tree shown in the screen shot 1700, the "Region" level along the "Regions" dimension is skipped.

Figure 18:
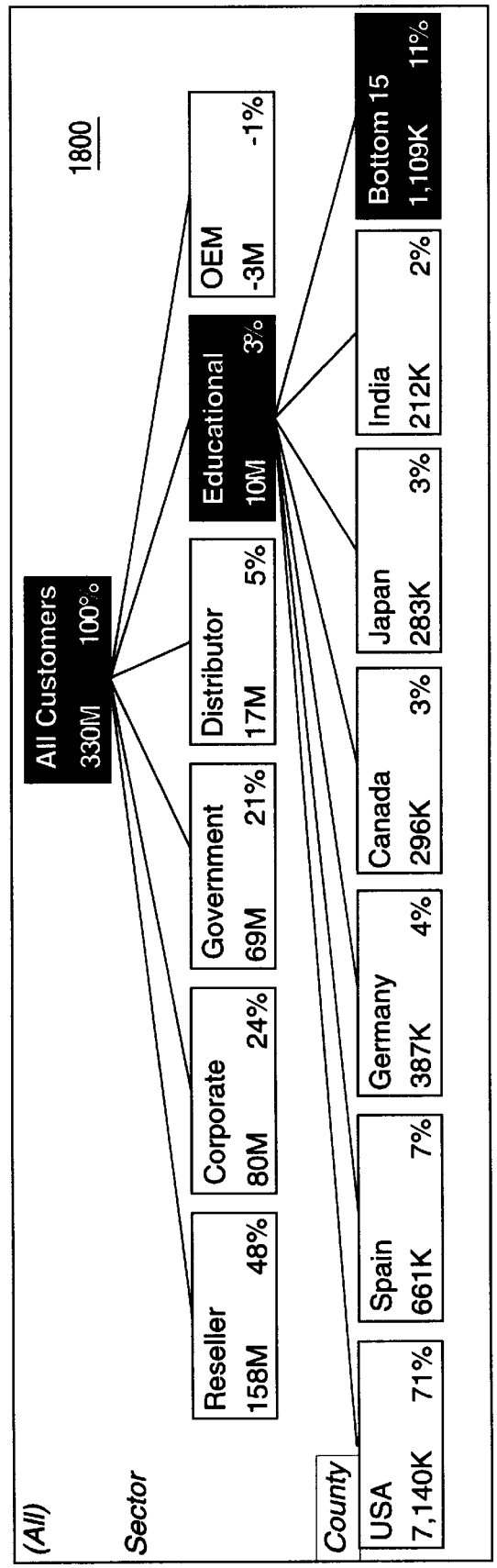
FIG. 18 shows a screen shot illustrating a step of displaying the child data points under the "Educational" data point.

FIGS. 18 shows a screen shot 1800 illustrating a step of displaying the child data points under the "Educational" data point. To break down the "Educational" data point, the user left-clicks on (selects) on the "Educational" data point icon in FIG. 17. In response, the Dtree program 208 retrieves the 21 data points under the "Educational" data point from the OLAP database 214, and displays six child data point icons to represent the 21 data points. Because the dimension has been changed from the "Customers" dimension to the "Regions" dimension at the "Country" level in the screen shot 1600, the "Educational" data point is broken down along the "Region" dimension at "Country" level. It can be noticed that the countries in the six data point icons in the screen shot 1800 are the same with those in the screen shot 1700. However, the sales values and display sequence of the six "Country" data point icons are changed in the screen shot 1800. For example, in the screen shot 1700, Spain is the fifth country in sales (2M) for the "Corporate Sector". In the screen shot 1800, Spain is the second country in sales (661K) for the "Educational Sector".

Figure 19:
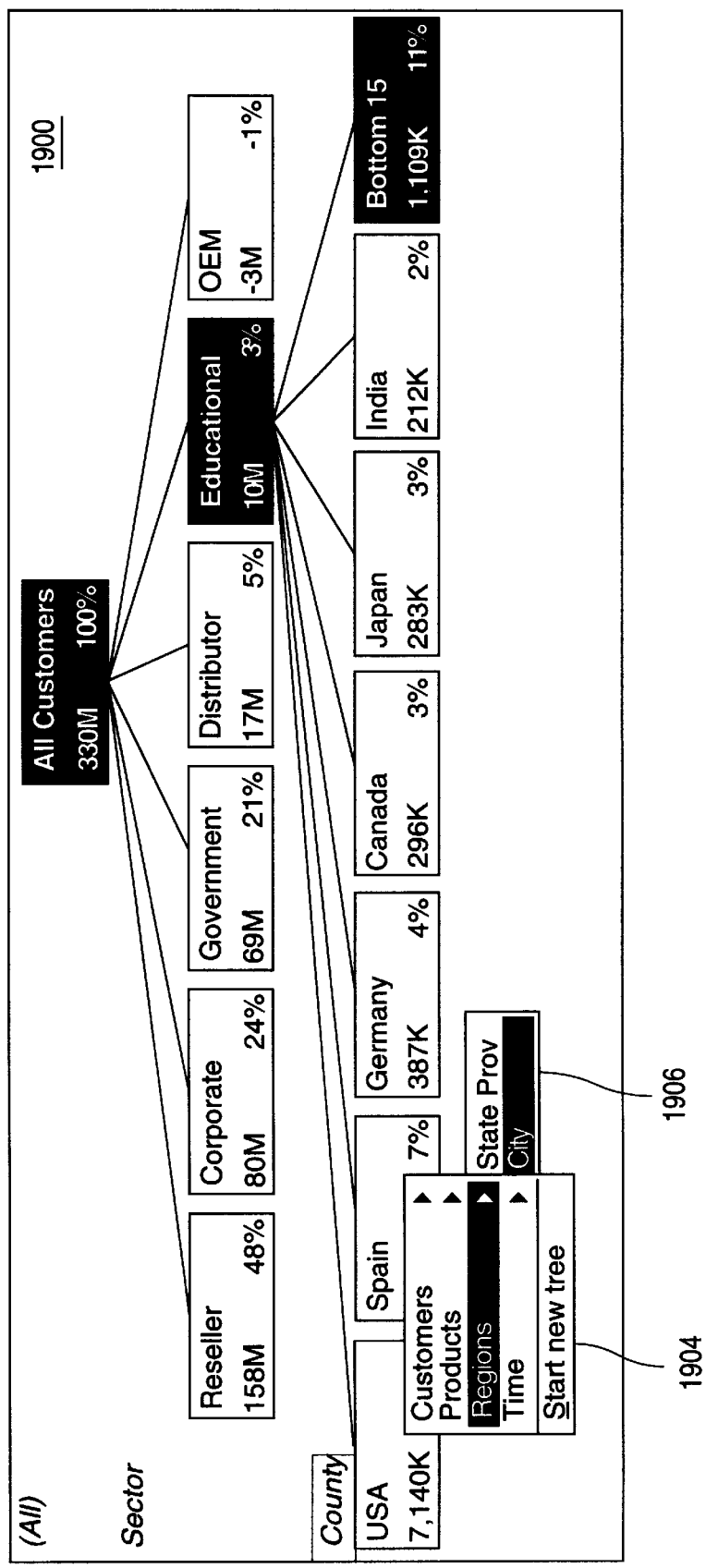
FIG. 19 shows a screen shot illustrating a step of selecting a level based on which the "USA" data point will be further broken down.

FIGS. 19 shows a screen shot 1900 illustrating a step of selecting a level based on which the "USA" data point will be further broken down. To do so, the user right-clicks on (selects) the "USA" data point icon. In response, the Dtree program 208 displays a dimension menu in a pull-down list 1904. In response to user's right-click on (selection of) the "Regions" dimension in the pull-down list 1904, the Dtree program 208 further displays a level menu in a pull-down list 1906. It can be noticed that the first two levels of the "Regions" dimension are not available in the level menu, because the "USA" data point is located at the "Country" level along the "Regions" dimension. The Dtree program 208 automatically updated the decomposing parameters in the decomposing process. Thus, the "USA" data point can only be broken down by the levels below the "Country" level. To select the "City" level, the user left-clicks on (selects) on the "City" level from the pull-down list 1906. In response, the Dtree program 208 displays the screen shot 2000 as shown in FIG. 20, to break down the "USA" data point to the "City" level along the "Regions" dimension.

Figure 20:
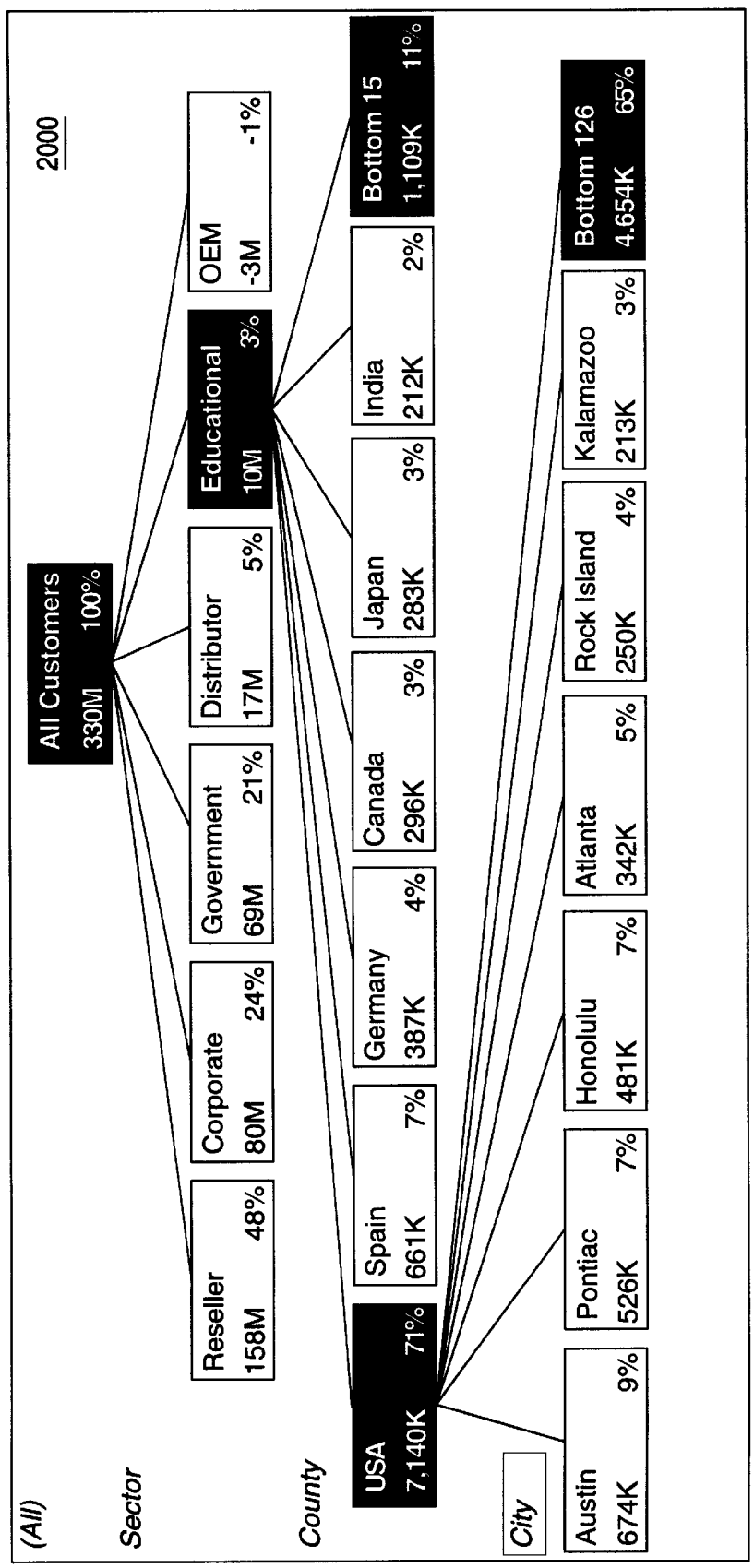
FIG. 20 shows a screen shot illustrating the decomposition tree resulting from the user's selection in the screen shot shown in FIG. 19.

FIG. 20 shows the screen shot 2000 illustrating the decomposition tree resulting from the user's selection in the screen shot 1900. The decomposition tree in the screen shot 2000 can reflect user's analysis process, or train-of-thought. As shown in the screen shot 2000, the "Education Sector" is the fifth Sector in terms of sales, the USA is the country having the largest sales (71% of all educational sales) in the "Educational Sector", and Austin is the city having the largest sales (9% of all educational sales) in the "Educational Sector" within the USA.

Figure 21:
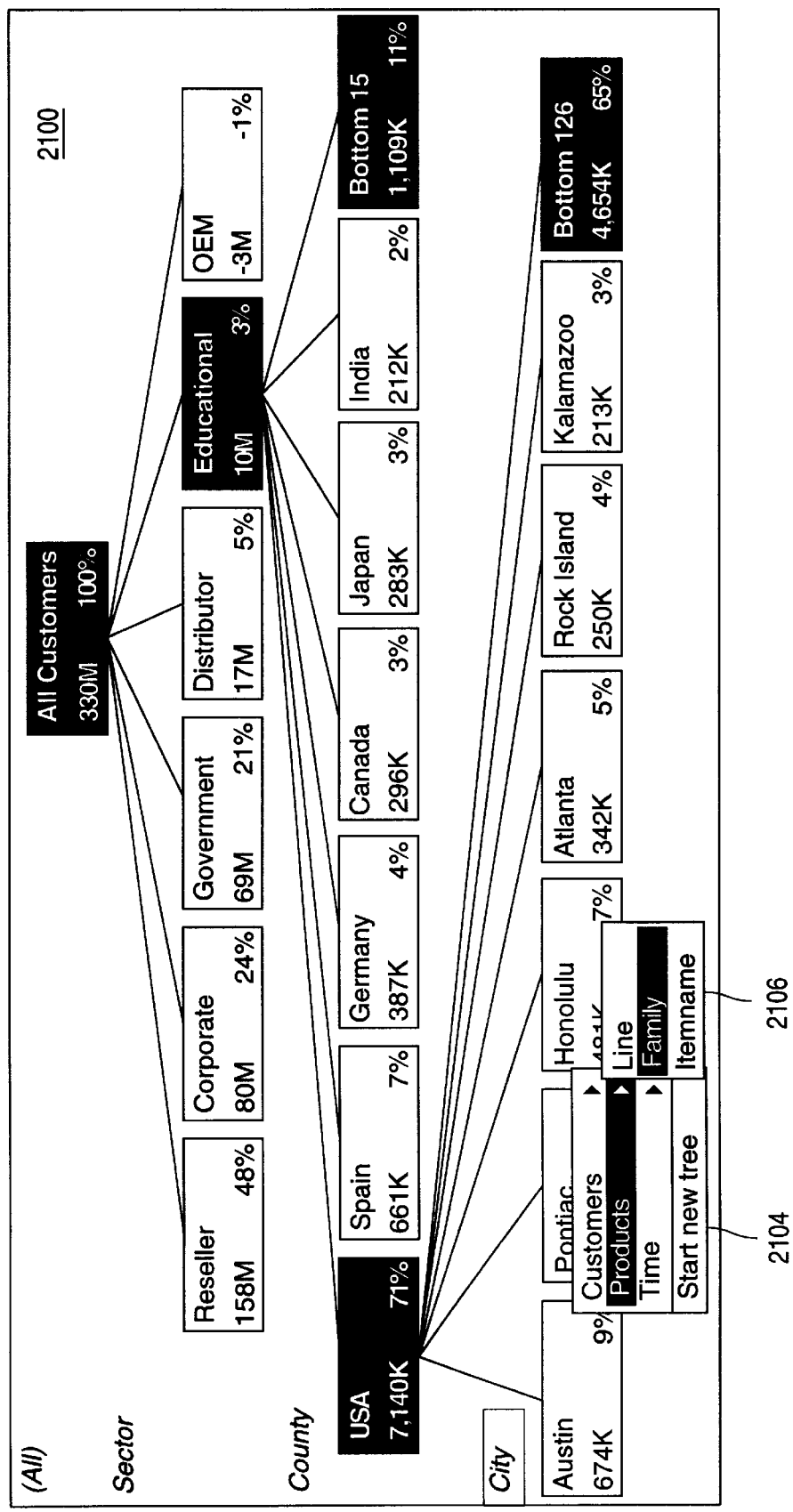
FIG. 21 shows a screen shot illustrating a step of changing dimension at "Austin" data point.

FIGS. 21 shows a screen shot 2100 illustrating a step of changing dimension at the "Austin" data point, so that the user can inquire "what product families are the "Educational" customers in the city of Austin buying?". To change the dimension at the "Austin" data point, the user right-clicks on (selects) the "Austin" data point. In response, the Dtree program 208 displays a dimension menu in a pull-down list 2104. In response to user's right-click on (selection of) the "Products" dimension in the pull-down list 2104, the Dtree program 208 displays a level menu in a pull-down list 2106. In response to user's right-click on (selection on the "Family" level in the pull-down list 2106, the Dtree program 208 changes the dimension from "Regions" at "City" level to "Products" at "Family" level. The Dtree program 208 then displays the screen shot 2200 as shown in FIG. 22.

Figure 22:
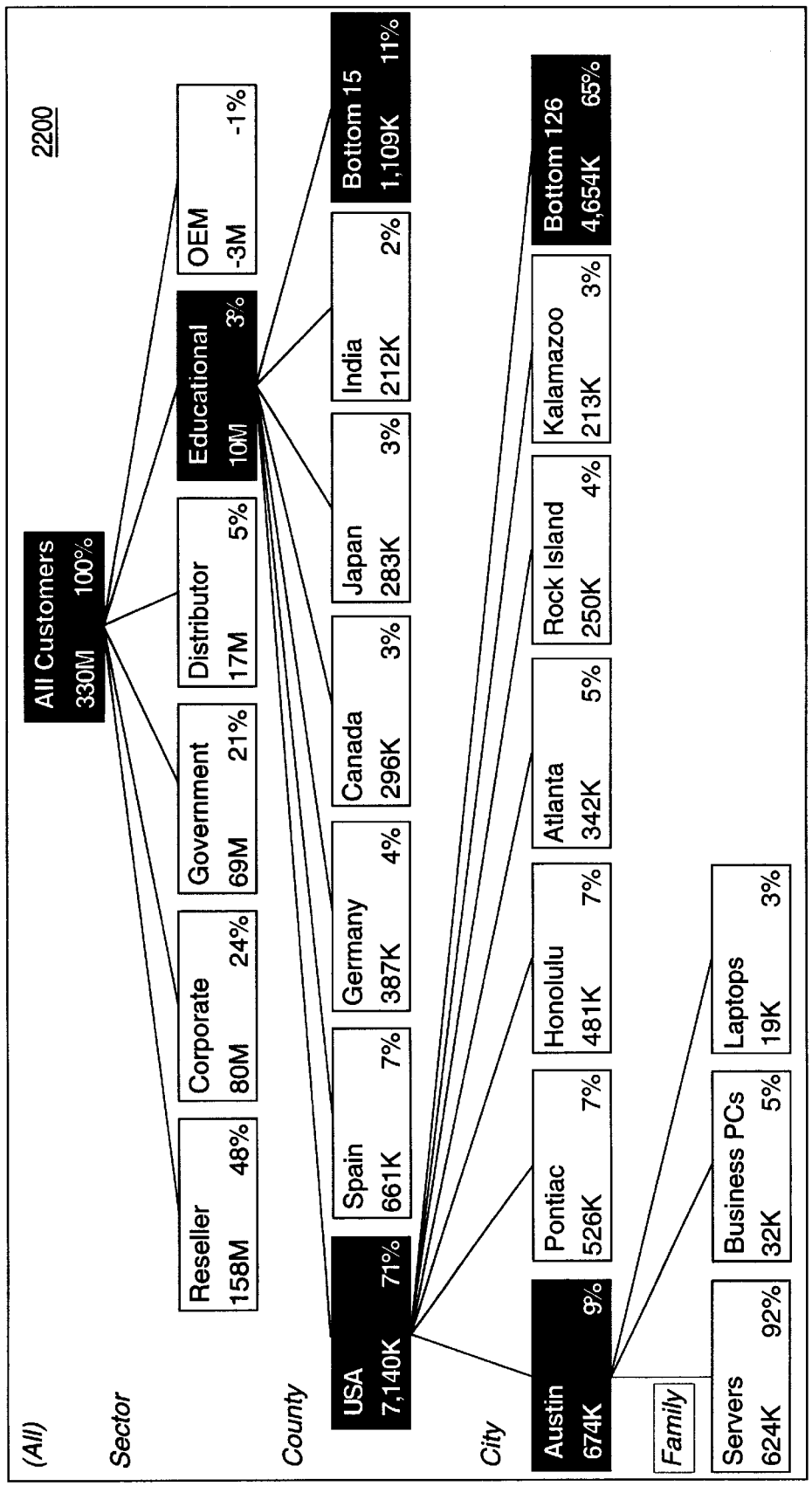
FIG. 22 shows a screen shot illustrating the decomposition tree resulting from the user's selection in FIG. 21.

FIG. 22 shows a screen shot 2200 illustrating the decomposition tree resulting from the user's selection in the screen shot 2100. As shown in FIG. 22, the screen shot 2200 displays a decomposition tree having five different levels of breaking down along three different dimensions. The decomposition tree skipped four levels in the breaking down process: (1) the "Sector" level of the "Customers" dimension (skipping the "Channel" level"), (2) the "Country" level of the "Regions" dimension (skipping the "Region" level), (3) the "City" level of the "Regions" dimension, and (4) the "Family" level of the "Products" dimension. The decomposition tree presents the user with a perspective view about the his/her analysis process. For example, even though the USA has the largest sales in the "Educational" sector, the Austin has the largest sales in the USA, and the Servers product accounts 92% of sales in Austin city; the "Educational Sector" itself counts only 3% of all sales. At this point, the user may need to inquire whether the "Server Product Family" is that dominate across all sales in the "Educational Sector". To do so, the user needs to change the break down level along the "Products" dimension at the "Educational" data point, as will be shown in the screen shot 2300.

Figure 23:
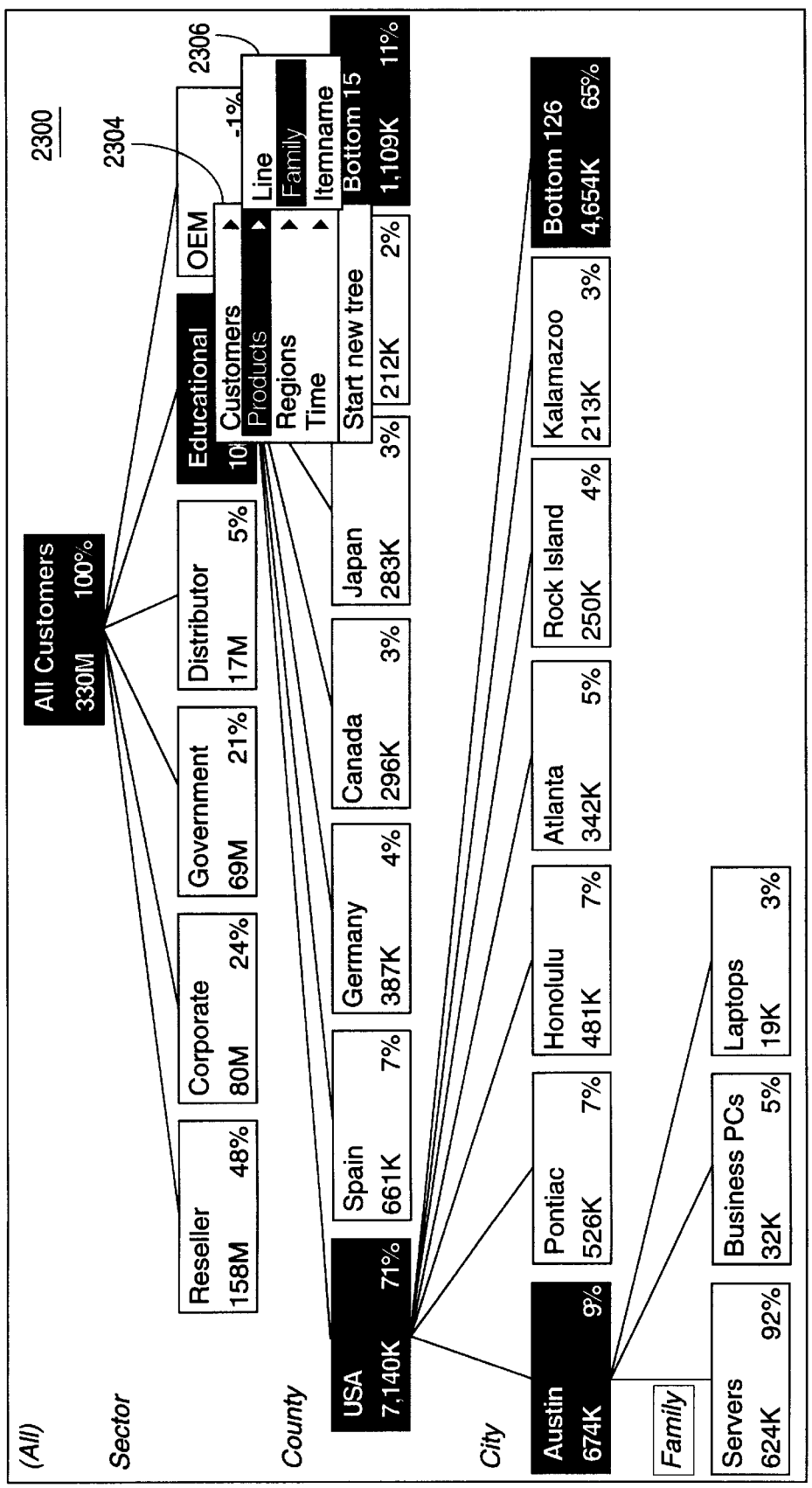
FIG. 23 shows a screen shot illustrating a step of changing the breaking down level along the "Product" dimension at the "Educational" data point.

FIGS. 23 shows the screen shot 2300 illustrating a step of changing the breaking down level along the "Product" dimension at the "Educational" data point. To change the break down level along the "Product" dimension, the user right-clicks on (selects) the "Educational" data point. In response, the Dtree program 208 displays a dimension menu in a pull-down list 2304. In response to user's right-click on (selection of) the "Products" dimension in the pull-down list 2304, the Dtree program 208 displays a level menu in a pull-down list 2306. In, response to user's right-click on (selection of) "Family" level in the pull-down list 2306, the Dtree program 208 displays the screen shot 2400, to break down the "Educational" data point at the "Family" level along the "Products" dimension.

FIG. 24 shows the screen shot 2400 illustrating the decomposition tree resulting from the user's selection in the screen shot 2300. As shown in the screen shot 2400, the decomposition tree indicates that Servers product has the largest sales across all sales in "Educational Sector". However, in contrast to the Servers product sales in Austin which makes up 92% of the total sales within the USA, the Servers product sales across the "Educational Sector" accounts only 43% of the all product sales. The decomposition tree shown in the screen shot 2400 provides additional information. Specifically, comparing with the decomposition tree in the screen shot 2400, the "Training", "Miscellaneous Services", and "Home PCs" product families even did not appear in the decomposition tree shown in the screen shot 2300. This means that the "Training", "Miscellaneous Services", and "Home PCs" product families did not have any sales to "Educational Customers" in Austin. At this point, the user may need to inquire the "Profit Margin" for the "Servers Product Family" across the "Educational Sector". To do so, the user needs to change the measure at the "Educational" data point, as will be shown in the screen shot 2500.

FIGS. 25 shows the screen shot 2500 illustrating a step of changing measure for the decomposition tree. To change the measure for the whole decomposition tree, the user right-clicks on (selects) a vacant area (meaning it does not contain any data point icons). In response, the Dtree program 208 displays a menu in a pull-down list 2504. In response to user's right-click on (selection on the "Measure" in the pull-down list 2504, the Dtree program 208 displays a screen shot 2600 as shown in FIG. 26.

Figure 26:
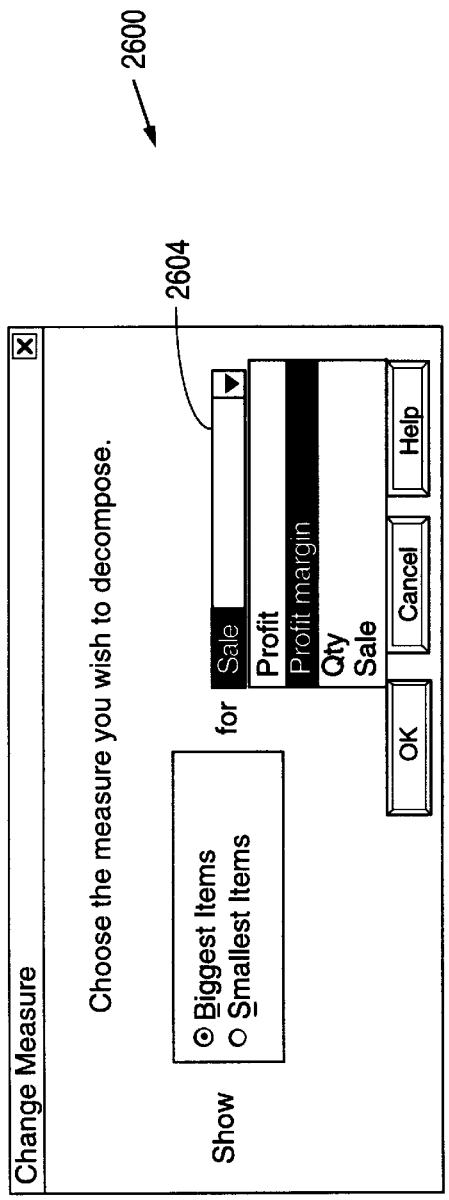
FIG. 26 shows a screen shot illustrating a measure menu.

FIG. 26 shows the screen shot 2600 illustrating a step of changing the measure for the decomposition tree. As shown in FIG. 26, the screen shot 2600 contains a measure menu in a pull-down list 2604. In response to user's right-click on (selection on the "Profit Margin" in the pull-down list 2604, the Dtree program 208 displays the screen shot 2700, to display the "Profit Margin" measures in the data point icons contained in the decomposition tree shown in FIG. 2700.

Figure 27:
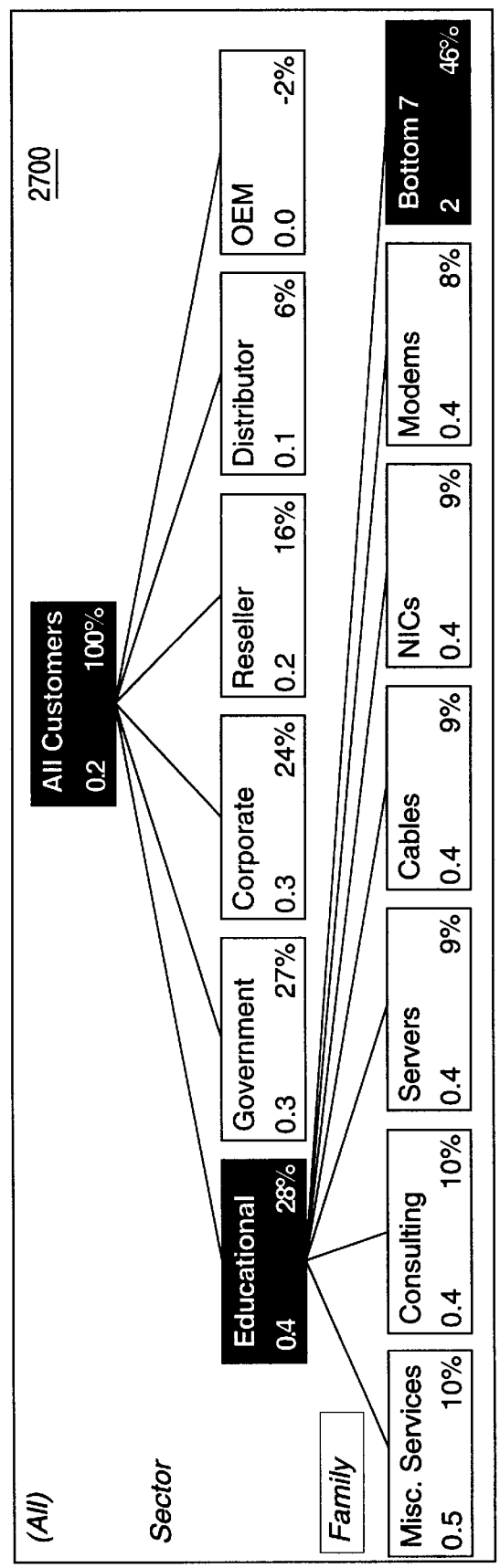
FIG. 27 shows a screen shot illustrating the decomposition tree resulting from the user's selection in FIG. 26.

FIG. 27 shows the screen shot 2700 illustrating the decomposition tree resulting from the user's selection in the screen shot 2600. As shown in the screen shot 2700, a "Profit Margin" measure is displayed within each of the data point icon in the decomposition tree. It can be noticed that the data points at both the "Sector" level and "Family" level are displayed in a descending order according to the "Profit Margin" measure.

Figure 28A:
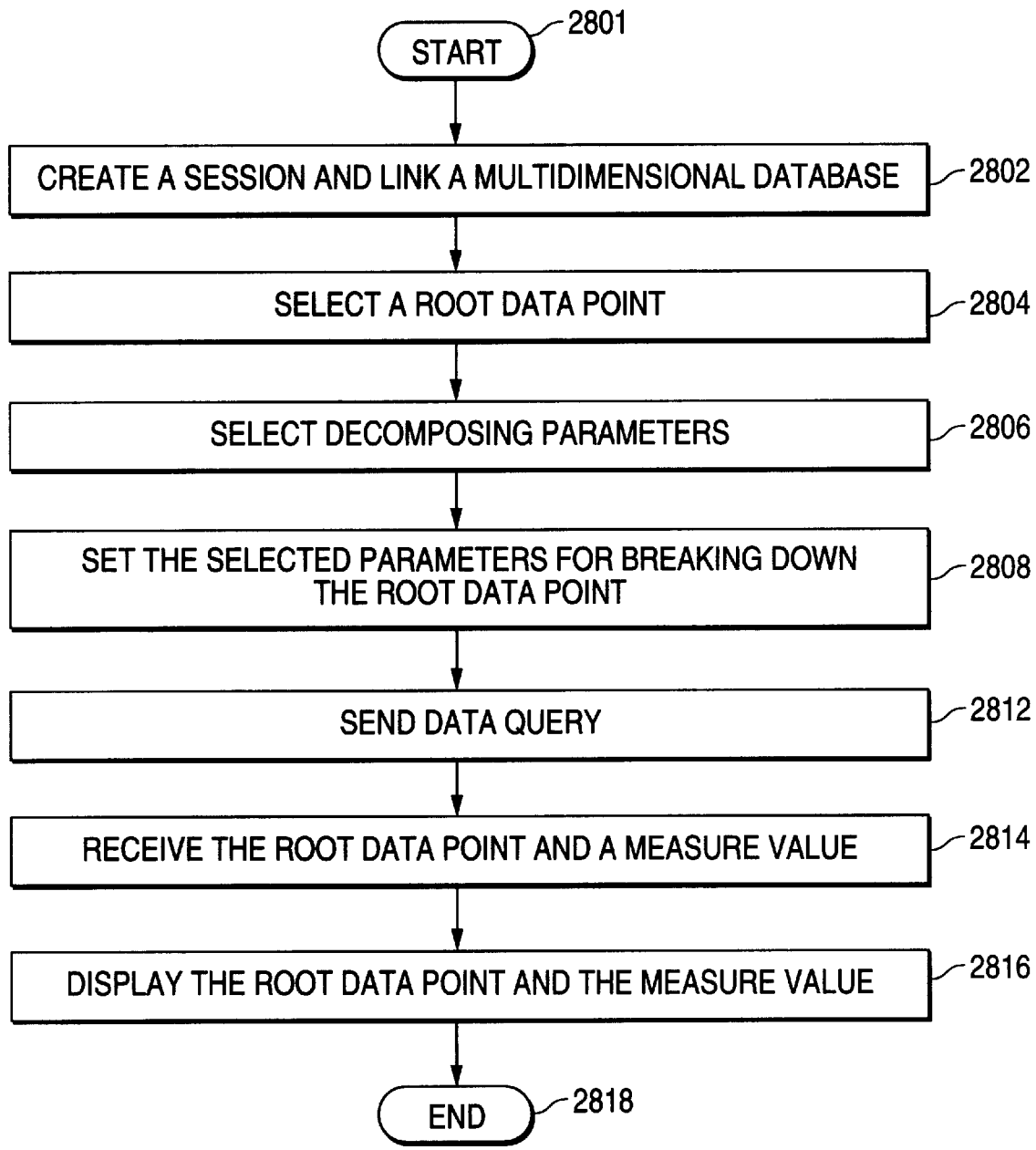
FIGS. 28A–B are two flowcharts for forming a decomposition tree.
Figure 28B:
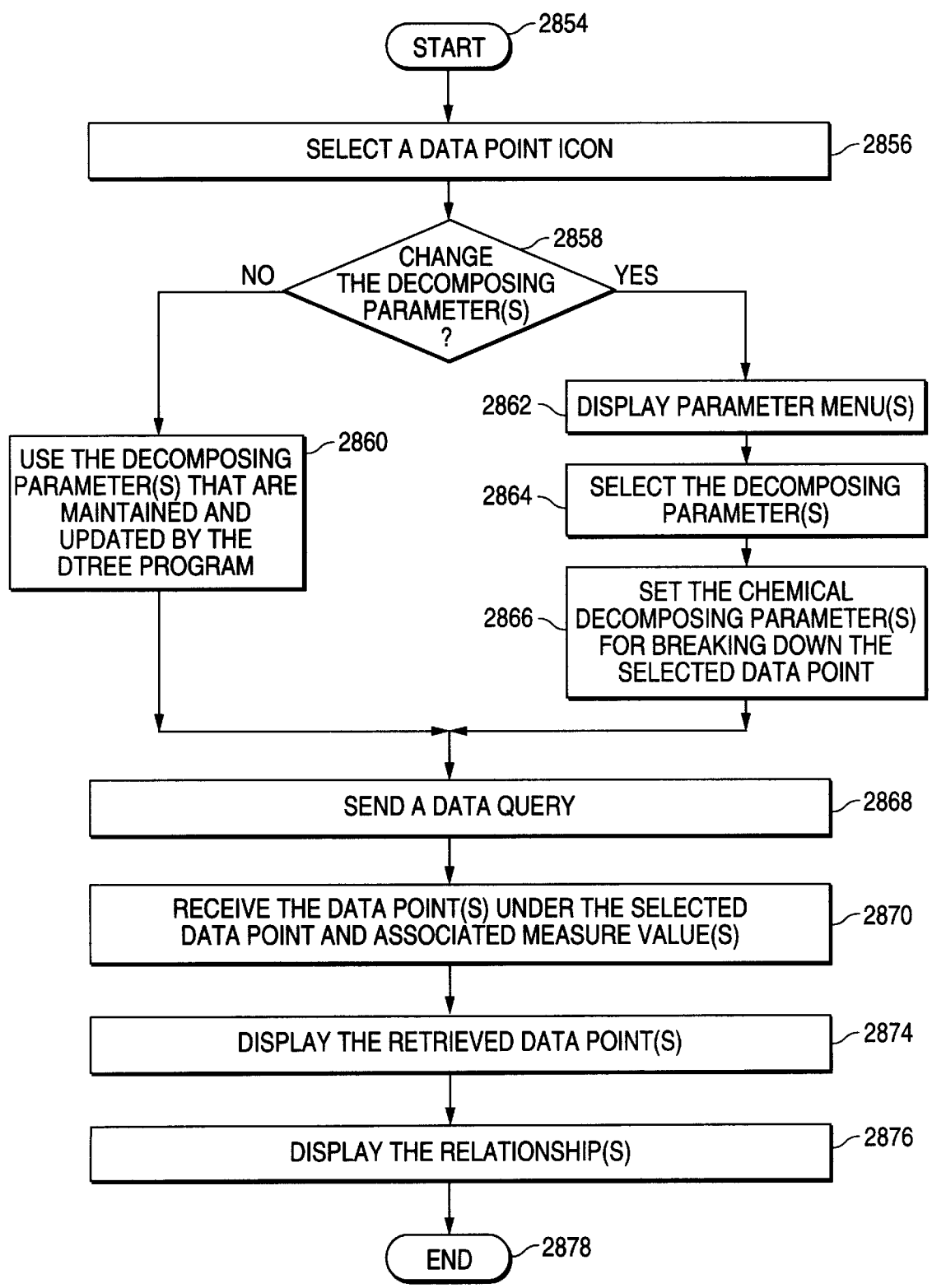

FIGS. 28A–B are two flowcharts for forming a decomposition tree in a data navigation process by a user, in accordance with the present invention.

FIG. 28A is a flowchart illustrating a process of selecting a root data point for the decomposition tree, in accordance with the present invention.

As shown in FIG. 28A, at step 2802, the user sends a control request, via the graphic user interface 206, to the Dtree program 208 to create a session. In response, the Dtree program 208 creates a session and links the session to a multidimensional database. (See FIG. 6).

At step 2804, the user selects a root data point via the graphic user interface 206.

At step 2806, the user selects decomposing parameters (including a dimension, the level within the dimension, and a measure) via the graphic user interface 206.

At step 2808, the Dtree program 208 sets the selected decomposing parameters for breaking down the root data point, in response to the selections in steps 2804 and 2806.

At step 2812, the Dtree program 208 sends a data query to the OLAP database API 210 to retrieve the root data point and the measure value associated with the root data point.

At step 2814, the Dtree program 208 receives the root data point and the associated measure value from the OLAP database API 210.

At step 2816, the Dtree program 208 displays a root data point icon on a computer monitor screen, together with the associated measure value, to represent the root data point.

FIG. 28B is a flowchart illustrating a process of breaking down a data point that is being displayed on the decomposition tree, in accordance with the present invention.

As shown in FIG. 28B, at step 2856, the user selects a data point icon (which represents a corresponding data point) from the decomposition tree that is being displayed on the computer monitor screen by left-clicking or right-clicking on the data point data icon. The user's selection causes the graphic user interface 206 sends a control request to the Dtree program 208.

At step 2858, the Dtree program 208 determines whether the decomposing parameters need to be changed. If the decomposing parameters need to be changed (i.e. the user has selected the data point by right-clicking on the data point icon, as shown in FIG. 19 or 21), the process is led to step 2862; if the decomposing parameters need not to be changed (i.e. the user has selected the data point by left-clicking on (selecting) the data point icon, as shown in FIG. 13 or 14), the process is led to step 2860.

At step 2860, if the decomposing parameters need not to be changed, the Dtree program 208 uses the decomposing parameters that are maintained in and updated by the Dtree program 208. The process is then led to step 2868.

At step 2862, if the decomposing parameters need to be changed, the Dtree program 208 displays parameter menu(s) containing parameter options. (See FIG. 19 or 21).

At step 2864, the user selects decomposing parameter(s) from the parameter menu(s). (See FIG. 19 or 21). The user's selection causes the graphic user interface 206 to send a control request to the Dtree program 208.

At step 2866, the Dtree program 208 sets the changed decomposing parameter(s) for breaking down the selected data point.

At step 2868, the Dtree program 208 sends a data query to the OLAP database API 210 to retrieve the data point(s) under the selected data point and the measure value(s) associated with the data point(s) to be retrieved. In the present invention, the Dtree program 208 requests the OLAP database API 120 to return the data point(s) in a sorted order according to the measure value(s).

At step 2870, the Dtree program 208 receives the data point(s) under the selected data point and the associated measure value(s) from the OLAP database API 210.

At step 2874, the Dtree program 208 displays data point icon(s) on the computer monitor screen, together with the associated measure value(s), to represent the retrieved data point(s). The retrieved data point(s) is/are displayed in an order according to the sorted measure value(s).

At step 2876, the Dtree program 208 displays the relationship(s) between the selected data point and the retrieved data point(s).

It should be appreciated that the present invention facilitates a user to explore the values and relationships among the data points in a multidimensional database by displaying these data points in a decomposition tree. The decomposition tree allows a user to easily navigate through N-dimensional data and quickly find the underlying values that are driving the aggregated measure values. With this decomposition tree, a user can navigate vertically through multiple layers into the data points that make up a parent data point and horizontally across multiple dimensions while maintaining a vertical perspective of the navigation paths within the multidimensional database. Specifically, the decomposition tree provides the following features and advantages:

1. The user may start a decomposition tree at any data point in a multidimensional database.
2. The user can decompose any data point to any of its descendent level along any dimension. The descendent levels may be skipped.
3. Once the user has selected the descendents from a dimensional level, those descendents are combined with the positional location from the other dimensions to derive the set of data points, referred to as the decomposition data point set.
4. Decomposition data points are sorted based on their measure value, and are displayed to the user in the order according to each data point's contribution.
5. The user can select any data point on the decomposition tree, making the selected data point the root data point of a new decomposition tree.
6. If a selected decomposition data set has more data points that can be displayed on the computer monitor screen, the decomposition tree automatically places all data points that cannot be displayed into a "group" data point representing the aggregation of all data points in that group.
7. The user can shift the data points in a "group" data point left or right to reveal the data points in the "group" data point.
8. Any data point in the decomposition tree can be selected and decomposed by any of its available descendent levels within any dimension in the multi-dimensional database.

Figure 29:
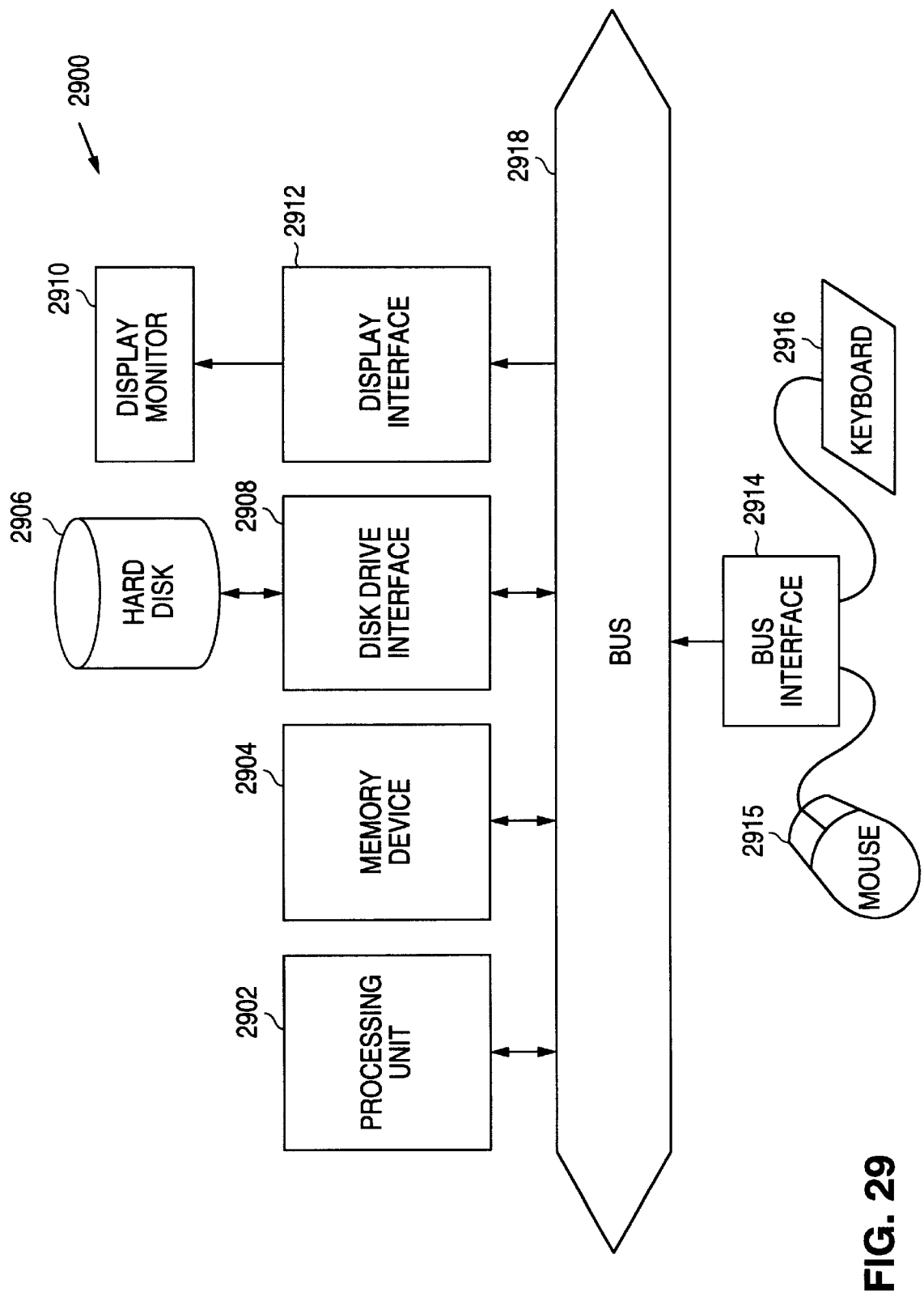
FIG. 29 is a block diagram of a computer system, which can be used as a hardware platform for running the program to perform the process shown in FIGS. 5–27 and 28A–B.

FIG. 29 shows a block diagram of a computer system 2900, which can be used as a hardware platform for running the program to form the decomposition tree in the present invention.

As shown in FIG. 29, the computer system comprises a processing unit 2902, a memory device 2904, a hard disk 2906, a disk drive interface 2908, a display monitor 2910 (including a computer monitor screen), a display interface 2912, a bus interface 2914, a mouse 2915, a keyboard 2916, and a system bus 2918.

Hard disk 2906 is coupled to disk drive interface 2908; display monitor 2910 is coupled to display interface 2912; and mouse 2915 and keyboard 2916 are coupled to bus interface 2924. Coupled to system bus 2918 are: processing unit 2902, memory device 2904, disk drive interface 2908, display interface 2912, and bus interface 2914.

Memory device 2904 is able to store programs (including data and instructions). Operating together with disk drive interface 2908, hard disk 2906 is also able to store programs. However, memory device 2904 has faster access speed than hard disk 2906, while hard disk 2906 has higher capacity than memory device 2904.

Operating together with display interface 2912, display monitor 2910 is able to provide graphic interface between programs being executed and a user.

Operating together with bus interface 2914, mouse 2915 and keyboard 2916 are able to provide inputs to computer system 2900.

Processing unit 2902 has access to memory device 2904 and hard disk 2906, and is able to control operations of computer 2900 by executing programs stored in memory device 2904 or hard disk 2906. Processing unit 2902 is also able to control the transmissions of programs and data between memory device 2904 and hard disk 2906.

The program to perform the process shown in FIGS. 5–27 and 28A–B are stored in memory device 2904 or hard disk 2906, and executed by the processing unit 2902.

While the invention has been illustrated and described in detail in the drawing and foregoing description, it should be understood that the invention may be implemented through alternative embodiments within the sprit of the present invention. Thus, the scope of the invention is not intended to be limited to the illustration and description in this specification, but is to be defined by the appended claims.

What is claimed is:

1. A method for displaying data points stored in a multi-dimensional data base, the data points being defined along at least two dimensions, the method comprising the steps of:
   extracting a parent data point from the multidimensional database;
   displaying the parent data point as a parent data point icon in a data point tree;
   selecting the parent data point icon from the data point tree;
   extracting, from the multidimensional data base, a plurality of child data points under the parent data points along of one of the at least two dimensions; and
   displaying the child data points as respective icons in the data point tree, together with relationships between the parent data point and the child data points.

2. The method of claim 1, the parent and child data points being associated with at least one measure, the method further comprising the step of:
   displaying respective values of the measure for the parent data point and the child data point icons.

3. The method of claim 2, further comprising the step of:
   displaying a measure contribution for each of the child data points to the measure of the parent data point.

4. The method of claim 2, further comprising the step of:
   displaying the child data points in an order according to their respective measure values.

5. A method for displaying data points stored in a multi-dimensional database, the data points being defined along at least two dimensions, the method comprising the steps of:
   extracting a parent data point from the multidimensional database;
   displaying the parent data point as a parent data icon in a data point tree;
   selecting the parent data point icon from the data point tree;
   extracting, from the multidimensional database, a plurality of child data points under the parent data point along one of the at least two dimensions;
   grouping a portion of the child data points;
   displaying the grouped child data points as a group icon in the data point tree, together with a relationship between the parent data point and the grouped child data points; and
   displaying the remaining child data points as individual child data point icons in the data tree, together with the relationships between the parent data point and the remaining child data points.

6. The method of claim 5, further comprising the step of:
   splitting one child data point from the grouped child data points by selecting the group icon from the data point tree;
   grouping two of the child data points that are individually displayed;
   displaying the two grouped child data points as an icon in the data point tree, together with a relationship between the parent data point and the two grouped two child data points; and
   displaying the split child data point as an icon in the data point tree, together with a relationship between the parent data point and the split child data point.

7. A method for displaying data points stored in a multi-dimensional database, the data points being defined along at least two dimensions including a first dimension and a second dimension, each of the dimension be divided into at least three levels having a parent level, a first child level and a second child level, the method comprising the steps of:
   selecting the first dimension;
   a parent data point from the multidimensional database;
   displaying the parent data point as an icon in a data point tree;
   selecting the parent data point icon from the data point tree;
   extracting, from the multidimensional database, a plurality of first level child data points under the parent data point along the first dimension;
   displaying the first level child data points as respective icons in the data point tree;
   selecting one of the child data icons from the data point tree;
   displaying a menu associated with the selected first level child data point, the menu containing the first and second dimensions;
   selecting the second dimension from the menu;
   extracting, from the multidimensional database, a plurality of second level child data points under the selected first level child data point along the second dimension; and
   displaying the second level child data points as individual icons in the data point tree, together with the relationships between the selected first level child data point and the second level child data points.

8. A method for displaying data points stored in a multi-dimensional database, the data points being defined along at least two dimensions including a first dimension and a second dimension, and being measured by at least two measures including a first measure and a second measure, the method comprising the steps of:
   selecting the first measure;
   extracting a parent data point from the multidimensional database;
   displaying the parent data point as an icon in a data point tree, together with a value of the first measure;

selecting the parent data point icon from the data point tree;

changing the first measure to the second measure;

extracting, from the multidimensional database, a plurality of child data points under the parent data point along one of the at least two dimensions;

displaying the child data points as respective icons in the data point tree; and displaying respective values of the second measure together with the parent data point icon and the child data point icons.

9. The method of claim 8, further comprising the step of:

displaying a menu containing the first and second measures in response to the selection of the parent data point icon; and selecting the second measure from the menu.

10. A method for displaying data points stored in a multidimensional database, the data points being defined along at least two dimensions, each of the at least two dimensions being divided into at least three levers having a first, second, and third levels, the method comprising the steps of:

selecting a data point at the first level;

extracting the data point at the first level from the multidimensional database;

displaying the first level data point as an icon in a data point tree;

selecting the first level data point icon from the data point tree;

selecting the third level;

extracting, from the multidimensional database, a plurality of child data points at the third level under the selected first level data point along one of the two least dimensions dimension;

displaying the third level child data points as respective icons in the data point tree, together with the relationships between the selected first level data point and the third level data points.

11. An apparatus for displaying data points stored in a multidimensional data base, the data points being defined along at least two dimensions, the apparatus comprising:

means for extracting a parent data point from the multidimensional database;

means for displaying the parent data point as a parent data point icon in a data point tree;

means for selecting the parent data point icon from the data point tree;

means for extracting, from the multidimensional data base, a plurality of child data points under the parent data points along of one of the at least two dimensions; and means for displaying the child data points as respective icons in the data point tree, together with relationships between the parent data point and the child data points.

12. The apparatus of claim 11, the parent and child data points being associated with at least one measure, the apparatus further comprising:

means for displaying respective values of the measure for the parent data point and the child data point icons.

13. The apparatus of claim 12, further comprising:

means for displaying a measure contribution for each of the child data points to the measure of the parent data point.

14. The apparatus of claim 12, further comprising:

means for displaying the child data points in an order according to their respective measure values.

15. An apparatus for displaying data points stored in a multidimensional database, the data points being defined along at least two dimensions, the apparatus comprising:

means for extracting a parent data point from the multidimensional database;

means for displaying the parent data point as a parent data icon in a data point tree;

means for selecting the parent data point icon from the data point tree;

means for extracting, from the multidimensional database, a plurality of child data points under the parent data point along one of the at least two dimensions;

means for grouping a portion of the child data points;

means for displaying the grouped child data points as a group icon in the data point tree, together with a relationship between the parent data point and the grouped child data points; and means for displaying the remaining child data points as individual child data point icons in the data tree, together with the relationships between the parent data point and the remaining child data points.

16. The apparatus of claim 15, further comprising:

means for splitting one child data point from the grouped child data points by selecting the group icon from the data point tree;

means for grouping two of the child data points that are individually displayed;

means for displaying the two grouped child data points as an icon in the data point tree, together with a relationship between the parent data point and the two grouped two child data points; and means for displaying the split child data point as an icon in the data point tree, together with a relationship between the parent data point and the split child data point.

17. An apparatus for displaying data points stored in a multidimensional database, the data points being defined along at least two dimensions including a first dimension and a second dimension, each of the dimension be divided into at least three levels having a parent level, a first child level and a second child level, the apparatus comprising:

means for selecting the first dimension;

means for extracting a parent data point from the multidimensional database;

means for displaying the parent data point as an icon in a data point tree;

means for selecting the parent data point icon from the data point tree;

means for extracting, from the multidimensional database, a plurality of first level child data points under the parent data point along the first dimension;

means for displaying the first level child data points as respective icons in the data point tree;

means for selecting one of the child data icons from the data point tree;

means for displaying a menu associated with the selected first level child data point, the menu containing the first and second dimensions;

means for selecting the second dimension from the menu;

means for extracting, from the multidimensional database, a plurality of second level child data points under the selected first level child data point along the second dimension; and means for displaying the second level child data points as individual icons in the data point tree, together with the relationships between the selected first level child data point and the second level child data points.

18. An apparatus for displaying data points stored in a multidimensional database, the data points being defined along at least two dimensions including a first dimension and a second dimension, and being measured by at least two measures including a first measure and a second measure, the apparatus comprising:

means for selecting the first measure;

means for extracting a parent data point from the multidimensional database;

means for displaying the parent data point as an icon in a data point tree, together with a value of the first measure;

means for selecting the parent data point icon from the data point tree;

means for changing the first measure to the second measure;

means for extracting, from the multidimensional database, a plurality of child data points under the parent data point along one of the at least two dimensions;

means for displaying the child data points as respective icons in the data point tree; and means for displaying respective values of the second measure together with the parent data point icon and the child data point icons.

19. The apparatus of claim 18, further comprising:

means for displaying a menu containing the first and second measures in response to the selection of the parent data point icon; and means for selecting the second measure from the menu.

20. An apparatus for displaying data points stored in a multidimensional database, the data points being defined along at least two dimensions, each of the at least two dimensions being divided into at least three levers having a first, second, and third levels, the apparatus comprising:

means for selecting a data point at the first level;

means for extracting the data point at the first level from the multidimensional database;

means for displaying the first level data point as an icon in a data point tree;

means for selecting the first level data point icon from the data point tree;

means for selecting the third level;

means for extracting, from the multidimensional database, a plurality of child data points at the third level under the selected first level data point along one of the two least dimensions dimension;

means for displaying the third level child data points as respective icons in the data point tree, together with the relationships between the selected first level data point and the third level data points.

21. A computer-readable medium containing instructions for displaying data points stored in a multidimensional data base, the data points being defined along at least two dimensions, wherein execution of the instructions performs the steps of:

extracting a parent data point from the multidimensional database;

displaying the parent data point as a parent data point icon in a data point tree;

selecting the parent data point icon from the data point tree;

extracting, from the multidimensional data base, a plurality of child data points under the parent data points along of one of the at least two dimensions; and displaying the child data points as respective icons in the data point tree, together with relationships between the parent data point and the child data points.

22. The computer-readable medium of claim 21, wherein execution of the instructions further performs the step of:

displaying respective values of the measure for the parent data point and the child data point icons.

23. The computer-readable medium of claim 22, wherein execution of the instructions further performs the step of:

displaying a measure contribution for each of the child data points to the measure of the parent data point.

24. The computer-readable medium of claim 22, wherein execution of the instructions further performs the step of:

displaying the child data points in an order according to their respective measure values.

25. A computer readable medium containing instructions for displaying data points stored in a multidimensional database, the data points being defined along at least two dimensions, wherein execution of the instructions performs the steps of:

extracting a parent data point from the multidimensional database;

displaying the parent data point as a parent data icon in a data point tree;

selecting the parent data point icon from the data point tree;

extracting, from the multidimensional database, a plurality of child data points under the parent data point along one of the at least two dimensions;

grouping a portion of the child data points;

displaying the grouped child data points as a group icon in the data point tree, together with a relationship between the parent data point and the grouped child data points; and displaying the remaining child data points as individual child data point icons in the data tree, together with the relationships between the parent data point and the remaining child data points.

26. The computer-readable medium of claim 25, wherein execution of the instructions further performs the steps of:

splitting one child data point from the grouped child data points by selecting the group icon from the data point tree;

grouping two of the child data points that are individually displayed;

displaying the two grouped child data points as an icon in the data point tree, together with a relationship between the parent data point and the two grouped two child data points; and displaying the split child data point as an icon in the data point tree, together with a relationship between the parent data point and the split child data point.

27. A computer-readable medium containing instructions for displaying data points stored in a multidimensional database, the data points being defined along at least two dimensions including a first dimension and a second dimension, each of the dimension be divided into at least three levels having a parent level, a first child level and a second child level, wherein execution of the instructions performs the steps of:

selecting the first dimension;

extracting a parent data point from the multidimensional database, displaying the parent data point as an icon in a data point tree;

selecting the parent data point icon from the data point tree;

extracting, from the multidimensional database, a plurality of first level child data points under the parent data point along the first dimension;

displaying the first level child data points as respective icons in the data point tree;

selecting one of the child data icons from the data point tree;

displaying a menu associated with the selected first level child data point, the menu containing the first and second dimensions;

selecting the second dimension from the menu;

extracting, from the multidimensional database, a plurality of second level child data points under the selected first level child data point along the second dimension; and displaying the second level child data points as individual icons in the data point tree, together with the relationships between the selected first level child data point and the second level child data points.

28. A computer-readable medium containing instruction for displaying data points stored in a multidimensional database, the data points being defined along at least two dimensions including a first dimension and a second dimension, and being measured by at least two measures including a first measure and a second measure, wherein execution of the instructions performs the steps of:

selecting the first measure;

extracting a parent data point from the multidimensional database;

displaying the parent data point as an icon in a data point tree, together with a value of the first measure;

selecting the parent data point icon from the data point tree;

changing the first measure to the second measure;

extracting, from the multidimensional database, a plurality of child data points under the parent data point along one of the at least two dimensions;

displaying the child data points as respective icons in the data point tree; and displaying respective values of the second measure together with the parent data point icon and the child data point icons.

29. The computer-readable medium of claim 28, wherein execution of the instructions further performs the steps of:

displaying a menu containing the first and second measures in response to the selection of the parent data point icon; and selecting the second measure from the menu.

30. A computer-readable medium containing instructions for displaying data points stored in a multidimensional database, the data points being defined along at least two dimensions, each of the at least two dimensions being divided into at least three levers having a first, second, and third levels, wherein execution of the instructions performs the steps of:

selecting a data point at the first level;

extracting the data point at the first level from the multidimensional database;

displaying the first level data point as an icon in a data point tree;

selecting the first level data point icon from the data point tree;

selecting the third level;

extracting, from the multidimensional database, a plurality of child data points at the third level under the selected first level data point along one of the two least dimensions dimension;

displaying the third level child data points as respective icons in the data point tree, together with the relationships between the selected first level data point and the third level data points.

* * * * *

UNITED STATES PATENT AND TRADEMARK OFFICE
CERTIFICATE OF CORRECTION

PATENT NO. : 6,167,396
DATED : December 26, 2000
INVENTOR(S) : Robert C. Lokken

It is certified that error appears in the above-identified patent and that said Letters Patent is hereby corrected as shown below:

Fig. 10,
Above screen shot, insert label -- 1000 --.

Fig. 28B, Box 2866,
Delete "CHEMICAL" and insert therefor -- CHANGED --.

Column 3,
Line 13, delete "illustrate" and insert therefor -- illustrating --.
Line 15, delete "illustrate" and insert therefor -- illustrating --.
Line 20, delete "illustrate" and insert therefor -- illustrating --.

Column 5,
Lline 2, after "divided" insert -- into --.
Line 19, delete "53" and insert therefor -- 53 --, and delete "59" and insert therefor -- 59 --.
Line 20, delete "171" and insert therefor -- 171 --, and delete "173" and insert therefor -- 173 --, and line 20, delete "174" and insert therefor -- 174 --.

Column 6,
Line 1, after selection, delete "on" and insert therefor -- of) --
Line 4, after selection, delete "on" and insert therefor -- of) --
Line 27, delete "short" and insert therefor -- shot --.
Line 46, after selection, delete "on" and insert therefor -- of) --
Line 48, after FIG, delete "1000" and insert therefor -- 10 --.

column 7,
Line 19, delete "short" and insert therefor -- shot --.
Line 23, delete "Customers dimension" and insert therefor -- "Customers" dimension --.
Line 26, delete "eight" and insert therefor -- six --.
Line 27, delete "eight" and insert therefor -- six --.
Line 39, delete "328" and insert therefor -- 328 --.
Line 40, delete "LAP" and insert therefor -- OLAP --.
Line 40, delete "328" and insert therefor -- 328 --.
Line 41, delete "323" and insert therefor -- 323 --.
Line 46, delete "323" and insert therefor --323--.
Line 52, delete "FIGS." And insert therefore -- FIG. --
Line 57, delete "157" and insert therefor -- 157 --.
Line 58, delete "157" and insert therefor -- 157 --.
Line 62, delete "151" and insert therefor -- 151 --.
Line 66, delete "151" and insert therefor --151--.

UNITED STATES PATENT AND TRADEMARK OFFICE
CERTIFICATE OF CORRECTION

PATENT NO. : 6,167,396
DATED : December 26, 2000
INVENTOR(S) : Robert C. Lokken

It is certified that error appears in the above-identified patent and that said Letters Patent is hereby corrected as shown below:

Column 8,
Line 1, delete "FIGS." and insert therefor -- FIG. --.
Line 20, delete "Sweanee Inc." and insert therefor -- Sewanee Inc, --
Line 21, delete "five" and insert therefor -- six --.
Line 23, delete "five" and insert therefor -- six --.
Line 23, after "are:" insert -- Eldena Networks --.
Line 26, delete "FIGS." and insert therefor -- FIG. --.
Line 37, delete "on" and insert therefor -- of) --.
Line 46, delete "FIGS." and insert therefor -- FIG. --.
Line 51, delete "21 " and insert therefor -- 21 --.
Line 52, delete "six" and insert therefor -- seven --.
Line 53, delete "21" and insert therefor -- 21 --.
Line 58, delete "six" and insert therefor -- seven --.
Line 61, delete "six" and insert therefor -- seven --.
Line 66, delete "FIGS." and insert therefor -- FIG. --.

Column 9,
Line 29, delete "FIGS." and insert therefor -- FIG --.
Line 40, after selection, delete "on" and insert therefor -- of) --.
Line 54, after dimension, insert -- (skipping the "State Prov" level) --.
Line 55, after dimension, insert -- (skipping the "Line" level) --.
Line 59, delete "Austin city" and insert therefor -- the City of Austin ---
Line 67, delete "FIGS." and insert therefor -- FIG. --.

Column 10,
Line 19, delete "USA" and insert therefor -- City of Austin --.
Line 21, after of, delete "the".
Lines 25-26, delete "even did not appear" and insert therefor -- did not even appear --.
Line 35, delete "FIGS." and insert therefor -- FIG. --.
Line 41, after selection, delete "on" and insert therefor -- of) --.
Line 48, after selection, delete "on" and insert therefor -- of) --.
Line 56, delete "icon" and insert therefor -- icons --.

Column 11, line 59, delete "API 120" and insert therefor --API 210--.

UNITED STATES PATENT AND TRADEMARK OFFICE
CERTIFICATE OF CORRECTION

PATENT NO. : 6,167,396
DATED : December 26, 2000
INVENTOR(S) : Robert C. Lokken

It is certified that error appears in the above-identified patent and that said Letters Patent is hereby corrected as shown below:

Column 12,
Line 24, delete "level" and insert therefor -- levels --.

Column 14,
Line 30, at the beginning of the sentence, before "a parent data point", insert -- extracting --

Column 15,
Line 20, delete "levers" and insert therefor -- levels --.
Line 21, delete "levels" and insert therefor -- level --.
Line 33, delete "two least dimensions dimension" and insert therefor -- at least two dimensions --.

Column 17,
Line 42, delete "levers" and insert therefor -- levels --.
Line 43, delete "levels" and insert therefor -- level --.
Line 55, delete "the least dimensions dimension" and insert therefor -- at least two dimensions --.

Column 20,
Line 22, delete "levers" and insert therefor -- levels --.
Line 23, delete "levels" and insert therefor -- level --.
Line 23, delete "two least dimensions dimension" and insert therefor -- at least two dimensions --.

Signed and Sealed this

Twenty-fifth Day of September, 2001

Attest:

*Nicholas P. Godici*

NICHOLAS P. GODICI
*Attesting Officer*   *Acting Director of the United States Patent and Trademark Office*